(12) United States Patent
Fukunaga et al.

(10) Patent No.: US 11,051,620 B2
(45) Date of Patent: Jul. 6, 2021

(54) CONTROLLER CHAIR

(71) Applicant: Fuji Medical Instruments Mfg. Co., Ltd., Osaka (JP)

(72) Inventors: Takeo Fukunaga, Osaka (JP); Masaki Ono, Osaka (JP)

(73) Assignee: FUJI MEDICAL INSTRUMENTS MFG. CO., LTD., Osaka (JP)

( * ) Notice: Subject to any disclaimer, the term of this patent is extended or adjusted under 35 U.S.C. 154(b) by 0 days.

(21) Appl. No.: 16/748,368

(22) Filed: Jan. 21, 2020

(65) Prior Publication Data
US 2020/0281359 A1 Sep. 10, 2020

(30) Foreign Application Priority Data

Mar. 8, 2019 (JP) .............................. JP2019-043025

(51) Int. Cl.
*A47C 1/022* (2006.01)
*A47C 1/03* (2006.01)
(Continued)

(52) U.S. Cl.
CPC .............. *A47C 7/142* (2018.08); *A47C 1/024* (2013.01); *A47C 1/0308* (2018.08); *A47C 7/144* (2018.08); *A47C 7/503* (2013.01); *A47C 7/5066* (2018.08); *A63B 71/0619* (2013.01); *A63F 13/285* (2014.09); *A63B 2071/0655* (2013.01)

(58) Field of Classification Search
CPC ....... A47C 1/0308; A47C 1/024; A47C 7/142; A47C 7/144; A47C 7/503; A47C 7/5066; A47C 7/52; A61G 5/128; A63B 71/0619; A63B 2071/0655; A63F 13/285

USPC .......... 297/285–299, 313, 314, 330, 423.18, 297/423.39, 423.4, 466, 217.4, 284.6, 297/452.41
See application file for complete search history.

(56) References Cited

U.S. PATENT DOCUMENTS 5,762,618 A * 6/1998 Yamanaka ................ A47C 4/54
601/148
5,792,082 A * 8/1998 Yamanaka ........... A61H 9/0078
601/148

(Continued)

FOREIGN PATENT DOCUMENTS

JP H10-151223 A 6/1998

*Primary Examiner* — Rodney B White
(74) *Attorney, Agent, or Firm* — Masuvalley & Partners

(57) ABSTRACT

A backrest portion supported, such as to be pivotable around an axis extending along its width direction center line, by a base, a left arm holding portion projecting forward from a left side portion of the backrest portion and supported, such as to be pivotable up and down around its base end portion, by the backrest portion, a right arm holding portion projecting forward from a right side portion of the backrest portion and supported, such as to be pivotable up and down around its base end portion, by the backrest portion, a left leg holding portion extending downward from a vicinity of a left side portion of a front edge of a seat portion at a front side of the base and supported, such as to be pivotable up and down around its upper end portion, by the base, and a right leg holding portion extending downward from a vicinity of a right side portion of the front edge of the seat portion at the front side of the base and supported, such as to be pivotable up and down around its upper end portion, by the base are included.

8 Claims, 18 Drawing Sheets

(51) Int. Cl.
  *A47C 1/034* (2006.01)
  *A47C 7/50* (2006.01)
  *A47C 7/54* (2006.01)
  *A47C 7/62* (2006.01)
  *A47C 7/72* (2006.01)
  *A47C 7/74* (2006.01)
  *A47C 20/00* (2006.01)
  *A47C 7/14* (2006.01)
  *A63B 71/06* (2006.01)
  *A63F 13/285* (2014.01)
  *A47C 1/024* (2006.01)

(56) References Cited

U.S. PATENT DOCUMENTS

| | | | | |
|---|---|---|---|---|
| 5,967,610 | A * | 10/1999 | Lin | A47C 3/18 297/183.9 |
| 6,116,687 | A * | 9/2000 | Vogtherr | A47C 7/448 297/291 X |
| 6,171,266 | B1 * | 1/2001 | Inada | 601/100 |
| 6,244,987 | B1 | 6/2001 | Ohsuga et al. | |
| 6,315,744 | B1 * | 11/2001 | Inaba | A61H 9/0078 601/148 |
| 6,491,652 | B1 * | 12/2002 | Hata | A61H 9/0078 601/148 |
| 6,517,500 | B2 * | 2/2003 | Ichikawa | A61H 7/001 601/101 |
| 6,783,179 | B2 * | 8/2004 | Komura | A61G 5/14 297/330 |
| 6,969,361 | B2 * | 11/2005 | Hsieh | A61H 15/0078 601/127 |
| 7,081,099 | B1 * | 7/2006 | Luo | A61H 7/00 601/103 |
| 7,195,604 | B2 * | 3/2007 | Nakamura | A61H 23/04 601/136 |
| 7,241,271 | B2 * | 7/2007 | Kurata | A61H 1/0266 601/148 |
| 7,273,461 | B2 * | 9/2007 | Baek | A61H 9/0078 601/134 |
| 7,293,839 | B2 * | 11/2007 | Shimizu | A61H 7/004 297/423.35 X |
| 7,338,458 | B2 * | 3/2008 | Hsien | A61H 15/0078 601/84 |
| 7,381,194 | B2 * | 6/2008 | Yoda | A61H 9/0071 601/133 |
| 7,434,879 | B2 * | 10/2008 | Ueda | A47C 7/4454 297/296 |
| 7,544,173 | B2 * | 6/2009 | Suzuki | A61H 1/0266 601/105 |
| 7,549,966 | B2 * | 6/2009 | Fujii | A61H 9/0078 601/133 |
| 7,566,312 | B2 * | 7/2009 | Tanizawa | A61H 23/02 601/101 |
| 7,640,090 | B2 * | 12/2009 | Uchida | B60N 2/002 701/49 |
| 7,665,805 | B2 * | 2/2010 | Ueda | A47C 1/03255 297/301.6 |
| 7,690,724 | B2 * | 4/2010 | Tanizawa | A61H 15/0078 297/217.3 |
| 7,708,340 | B2 * | 5/2010 | Tanizawa | A61H 1/0281 297/411.35 X |
| 7,712,833 | B2 * | 5/2010 | Ueda | A47C 1/03261 297/296 |
| 7,717,513 | B2 * | 5/2010 | Ueda | A47C 7/444 297/300.2 |
| 7,717,868 | B2 * | 5/2010 | Inada | A61H 9/0078 601/90 |
| 7,789,466 | B2 * | 9/2010 | Yoda | A47C 1/034 297/423.35 |
| 7,828,756 | B2 * | 11/2010 | Kamba | A61H 1/003 601/98 |
| 8,083,700 | B2 * | 12/2011 | Tanizawa | A61H 23/04 601/148 |
| 8,690,239 | B2 * | 4/2014 | Ishikawa | A61H 23/02 297/217.1 |
| 9,138,057 | B2 * | 9/2015 | Furutani | A47C 1/035 |
| 9,173,804 | B2 * | 11/2015 | Ishikawa | A61H 15/0078 |
| 10,058,180 | B2 * | 8/2018 | Desanta | A47C 1/032 |
| 10,226,396 | B2 * | 3/2019 | Ashby | A61H 15/0078 |
| 10,441,497 | B2 * | 10/2019 | Yoshida | A61H 23/0263 |
| 10,639,230 | B2 * | 5/2020 | Le | A61H 23/006 |
| 10,729,611 | B2 * | 8/2020 | Ode | A61H 15/0078 |
| 10,842,708 | B2 * | 11/2020 | Le | A61H 15/00 |
| 10,905,624 | B2 * | 2/2021 | Le | A61H 9/0078 |
| 10,932,576 | B2 * | 3/2021 | Levin | A47C 1/0308 |
| 2003/0006639 | A1 * | 1/2003 | Shimizu | A61H 23/02 297/466 X |
| 2004/0195882 | A1 * | 10/2004 | White | A47C 7/16 297/284.3 |
| 2006/0217642 | A1 * | 9/2006 | Tanizawa | A61H 15/00 601/98 |
| 2006/0217643 | A1 * | 9/2006 | Yonekawa | A61H 9/0078 601/148 |
| 2006/0241536 | A1 * | 10/2006 | Yoda | A61H 7/00 601/98 |
| 2007/0120408 | A1 * | 5/2007 | Hsieh | A47C 7/54 297/411.39 |
| 2007/0287941 | A1 * | 12/2007 | Yoda | A61H 9/0078 601/151 |
| 2010/0022926 | A1 * | 1/2010 | Kramer | A47C 7/506 297/217.4 X |
| 2010/0126787 | A1 * | 5/2010 | Kawada | A61G 5/128 180/21 |
| 2010/0198120 | A1 * | 8/2010 | Tago | A61H 1/0292 601/134 |
| 2010/0198121 | A1 * | 8/2010 | Tago | A61H 9/0078 601/150 |
| 2010/0249613 | A1 * | 9/2010 | Hashimoto | A61B 5/0245 600/485 |
| 2010/0301640 | A1 * | 12/2010 | Heiser | A47C 1/10 297/217.4 X |
| 2010/0312155 | A1 * | 12/2010 | Fukuyama | A61H 9/0078 601/98 |
| 2011/0015554 | A1 * | 1/2011 | Morikawa | A61H 1/0292 601/84 |
| 2011/0035101 | A1 * | 2/2011 | Kawada | A61G 5/043 701/36 |
| 2013/0313882 | A1 * | 11/2013 | Yin | A47C 7/5066 297/423.22 |
| 2014/0191541 | A1 * | 7/2014 | Ohta | A61G 5/128 297/118 |
| 2015/0021969 | A1 * | 1/2015 | Yin | B60N 2/62 297/423.26 |
| 2015/0060162 | A1 * | 3/2015 | Goffer | A61G 5/124 180/41 |
| 2015/0313790 | A1 * | 11/2015 | Inada | A61H 15/0078 601/134 |
| 2015/0351997 | A1 * | 12/2015 | Le | A61H 9/0078 601/150 |
| 2017/0056280 | A1 * | 3/2017 | Ode | A61H 9/0078 |
| 2017/0181920 | A1 * | 6/2017 | Okamoto | A61H 7/007 |
| 2017/0258673 | A1 * | 9/2017 | Inada | A61H 7/004 |
| 2017/0348179 | A1 * | 12/2017 | Inada | G16H 20/30 |
| 2017/0348188 | A1 * | 12/2017 | Inada | A61H 9/0078 |
| 2018/0133101 | A1 * | 5/2018 | Inada | A61H 7/007 |
| 2020/0197255 | A1 * | 6/2020 | Bae | A61H 39/06 |

* cited by examiner

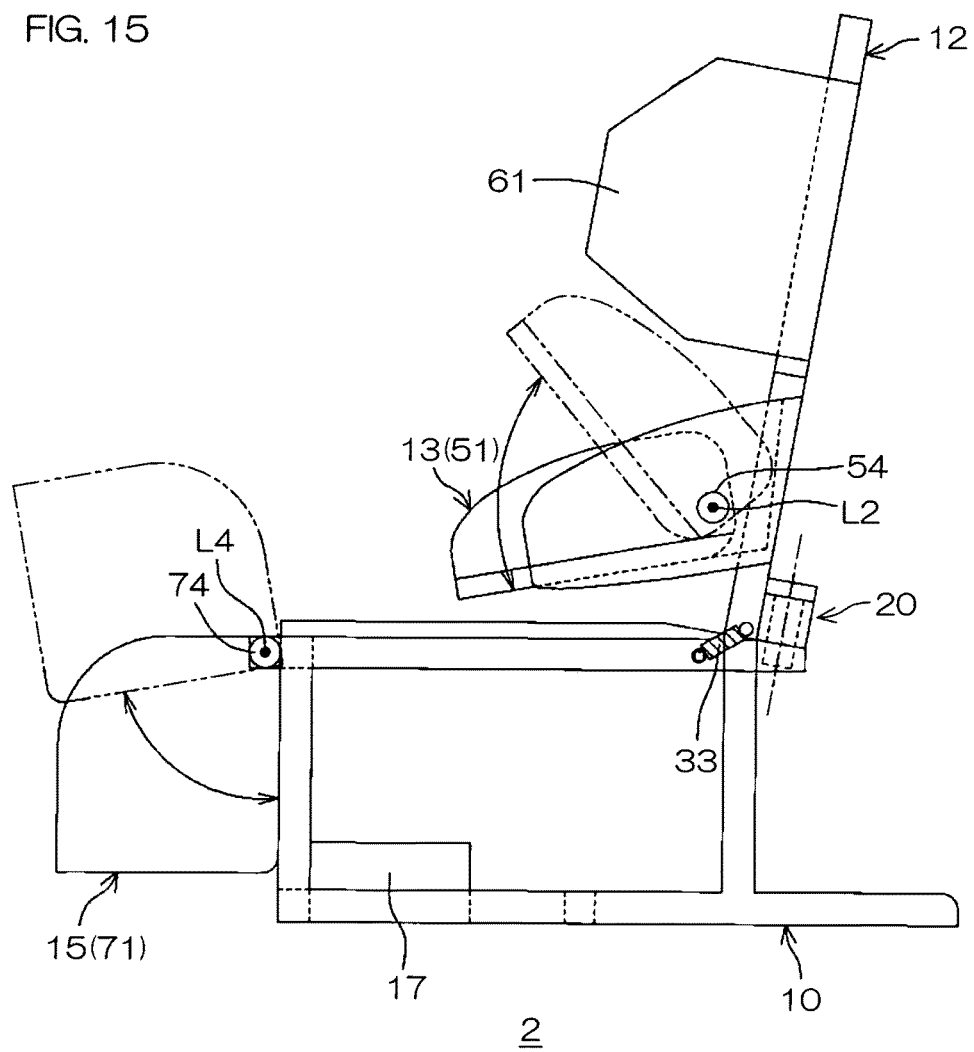

CONTROLLER CHAIR

RELATED APPLICATIONS

This application claims priority to Japanese Patent Application No. 2019-043025 filed Mar. 8, 2019, which is hereby incorporated herein by reference in its entirety.

BACKGROUND OF THE INVENTION

1. Field of the Invention

The present invention relates to a controller chair arranged to generate a signal in accordance with a movement of a user.

2. Description of the Related Art

A wellness system that includes an exercise load providing means that provides an appropriate exercise load to a user and detects a physical exercise of the user is disclosed in Japanese Patent Application Publication No. 10-151223. It is disclosed in Japanese Patent Application Publication No. 10-151223 that the physical exercise of the user (for example, walking of the user) is measured at the exercise load providing means and, in accordance with the walking, a video image displayed by a video image unit, sound produced by an acoustic unit, and wind and fragrance produced by a wind/fragrance unit are changed. And, as the exercise load providing means that provides the exercise load to the user and detects the physical exercise of the user, an equipment for performing an alternating leg stepping movement (flexing and extending of the knees) is disclosed in FIG. 5 of Japanese Patent Application Publication No. 10-151223.

SUMMARY OF THE INVENTION

An object of the present invention is to provide a controller chair capable of generating signals in accordance with respective movements of the torso, the left arm, the right arm, the left leg, and the right leg of a user.

In order to overcome the previously unrecognized and unsolved challenges described above, a preferred embodiment of the present invention provides a controller chair. The controller chair includes a seat portion supported by a base, a backrest portion extending upward or obliquely upward from a rear edge side of the seat portion and supported, such as to be pivotable around an axis extending along its width direction center line, by the base, a left arm holding portion projecting forward from a left side portion of the backrest portion and supported, such as to be pivotable up and down around its base end portion, by the backrest portion, a right arm holding portion projecting forward from a right side portion of the backrest portion and supported, such as to be pivotable up and down around its base end portion, by the backrest portion, a left leg holding portion extending downward from a vicinity of a left side portion of a front edge of the seat portion at a front side of the base and supported, such as to be pivotable up and down around its upper end portion, by the base, a right leg holding portion extending downward from a vicinity of a right side portion of the front edge of the seat portion at the front side of the base and supported, such as to be pivotable up and down around its upper end portion, by the base, and a first rotation angle detecting portion, a second rotation angle detecting portion, a third rotation angle detecting portion, a fourth rotation angle detecting portion, and a fifth rotation angle detecting portion detecting respective rotation angles of the backrest portion, the left arm holding portion, the right arm holding portion, the left leg holding portion, and the right leg holding portion.

According to this arrangement, a controller chair capable of generating signals in accordance with respective movements of the torso, the left arm, the right arm, the left leg, and the right leg of a user can be realized.

In the preferred embodiment of the present invention, the left arm holding portion includes a left forearm housing recess and a left arm fixing airbag capable of being inflated and deflated and provided at least at one of either of both side wall inner surfaces of the left forearm housing recess, and the right arm holding portion includes a right forearm housing recess and a right arm fixing airbag capable of being inflated and deflated and provided at least at one of either of both side wall inner surfaces of the right forearm housing recess.

In the preferred embodiment of the present invention, the left leg holding portion includes a left lower thigh housing recess and a left leg fixing airbag capable of being inflated and deflated and provided at least at one of either of both side wall inner surfaces of the left lower thigh housing recess, and the right leg holding portion includes a right lower thigh housing recess and a right leg fixing airbag capable of being inflated and deflated and provided at least at one of either of both side wall inner surfaces of the right lower thigh housing recess.

In the preferred embodiment of the present invention, a shoulder fixing portion provided at the backrest portion and arranged to fix the shoulders of a user to the backrest portion is further included, and the shoulder fixing portion includes a left shoulder holder projecting forward from a left side portion of the backrest portion further upward than a portion coupled to the left arm holding portion, a right shoulder holder projecting forward from a right side portion of the backrest portion further upward than a portion coupled to the right arm holding portion, a left shoulder pressing airbag capable of being inflated and deflated and provided at a surface of the left shoulder holder facing the right shoulder holder, and a right shoulder pressing airbag capable of being inflated and deflated and provided at a surface of the right shoulder holder facing the left shoulder holder.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15 is a right side view for describing how the left arm holding portion and the left leg holding portion are pivoted.

DETAILED DESCRIPTION OF THE PREFERRED EMBODIMENTS

Figure 1:
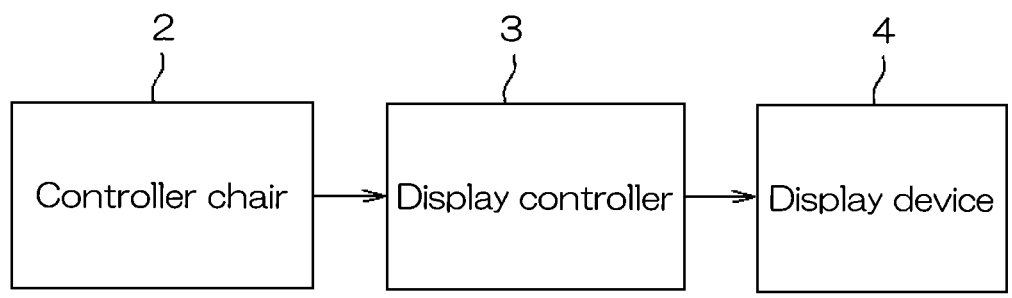
FIG. 1 is a block diagram of the arrangement of a video image display system that includes a controller chair according to a preferred embodiment of the present invention.

FIG. 1 is a block diagram of the arrangement of a video image display system that includes a controller chair according to a preferred embodiment of the present invention.

The video image system 1 includes the controller chair 2, a display controller 3, and a display device 4. The controller chair 2 generates signals in accordance with movements of a user sitting on the controller chair 2. In the present preferred embodiment, the controller chair 2 generates signals in accordance with respective movements of the torso (shoulder portion, chest portion, trunk portion, and waist portion), the left arm, the right arm, the left leg, and the right leg of the user.

The display controller 3 makes the display device 4 display predetermined video contents. In this process, the display controller 3 makes a video image made to be displayed by the display device 4 change based on the signals from the controller chair 2. For example, the display controller 3 makes a movement of a character included in the video image change based on the signals from the controller chair 2. The character may be a character that is a representation of the user (avatar). In this case, the display controller 3 is capable, for example, of making the torso (shoulders), the left arm, the right arm, the left leg, and the right leg of the avatar change in accordance with the respective movements of the torso (shoulders), the left arm, the right arm, the left leg, and the right leg of the user.

The display device 4 may be a head mounted type display device (head mounted display) that can be mounted on the head of the user or may be a type of display device that is not mounted on the head of the user. Specifically, the display device 4 may be a projector that projects the video image on a wall, etc., or may be a spherical display arranged from an organic EL, etc., or may be a dome type (bell-shaped) display device disposed such as to cover the head of a person being treated from above and having a display surface at an inner surface.

The controller chair 2 shall now be described in detail.

Figure 2:
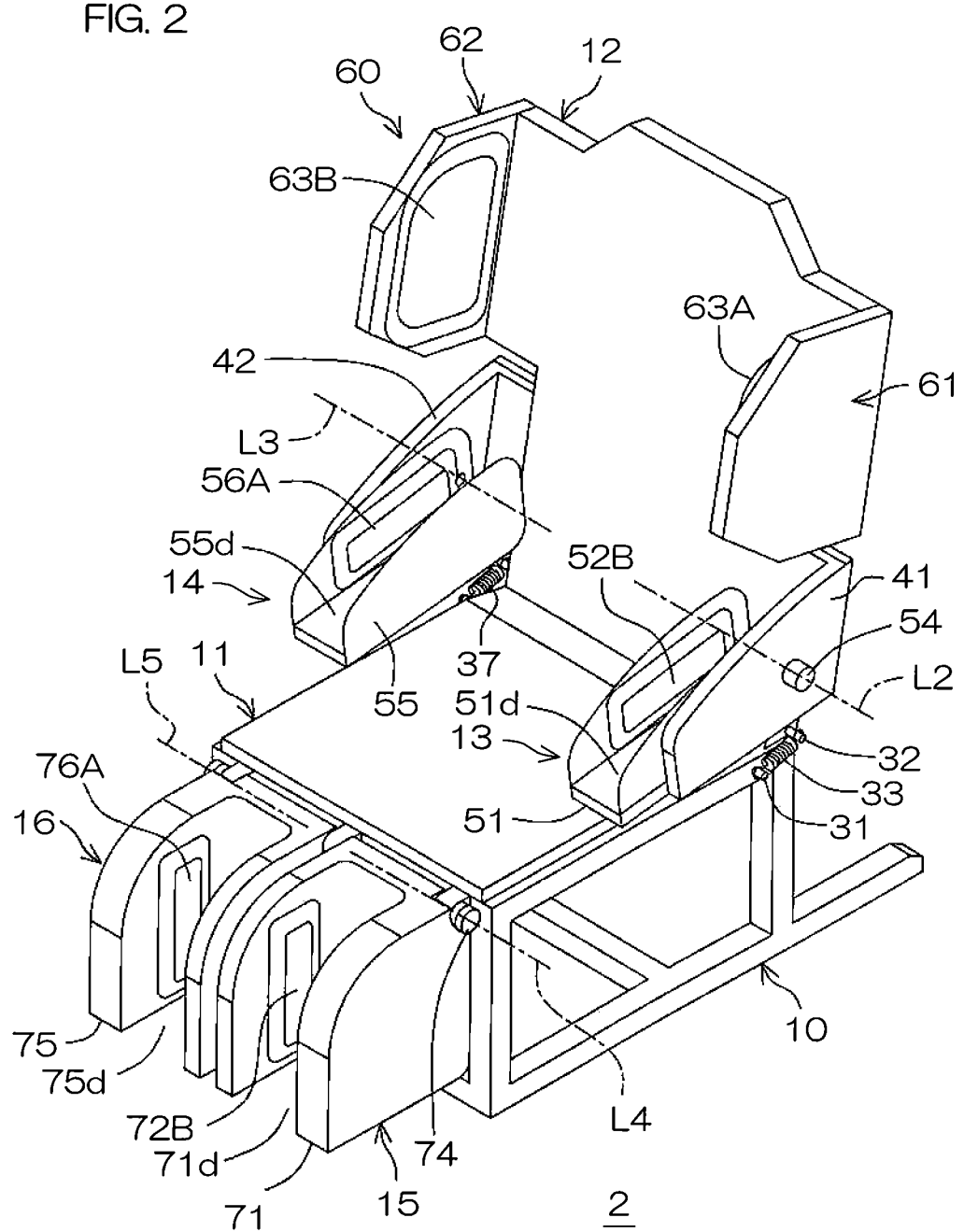
FIG. 2 is a perspective view of an outer appearance of the controller chair.
Figure 3:
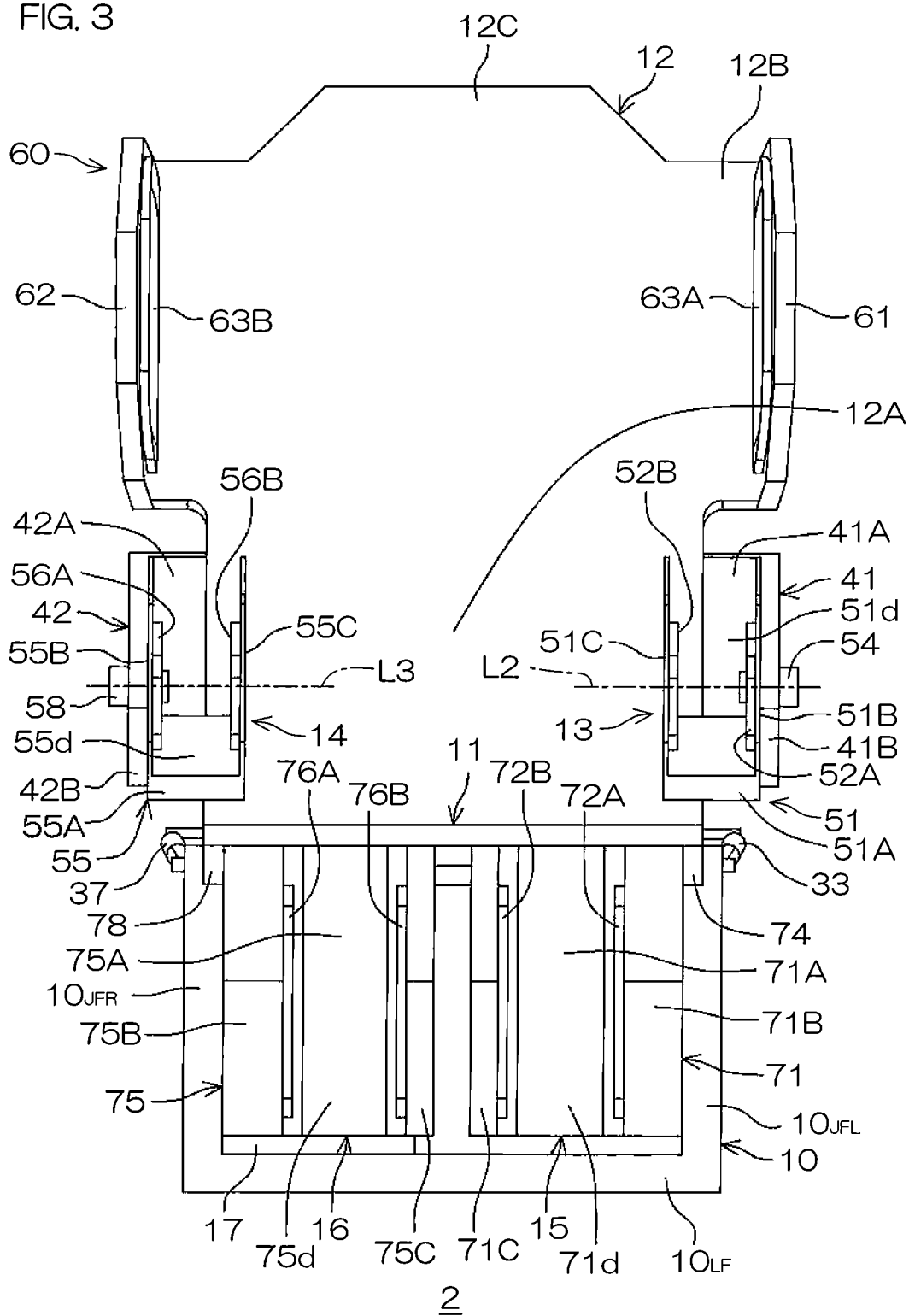
FIG. 3 is a front view of FIG. 2.
Figure 4:
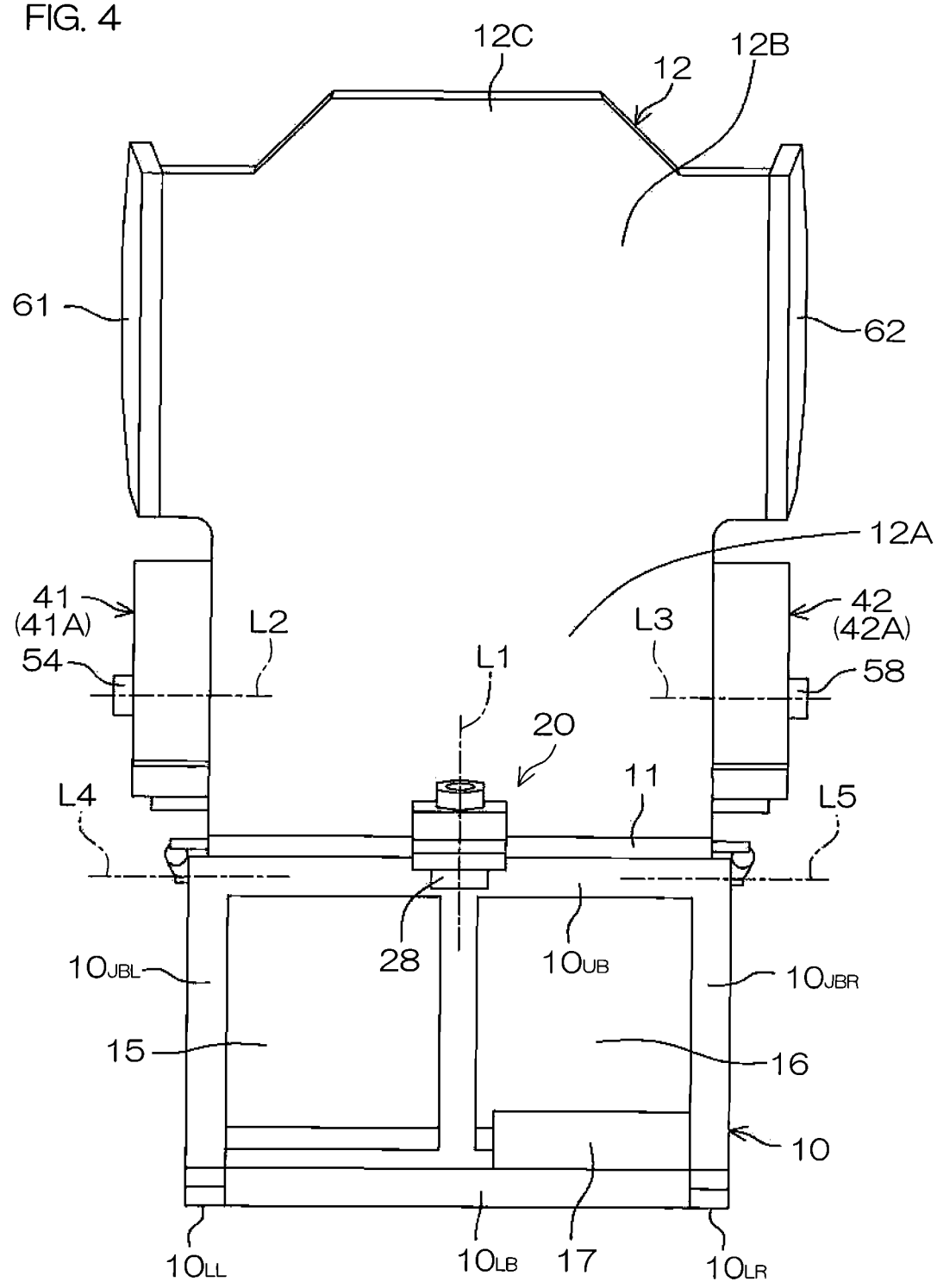
FIG. 4 is a rear view of FIG. 2.
Figure 5:
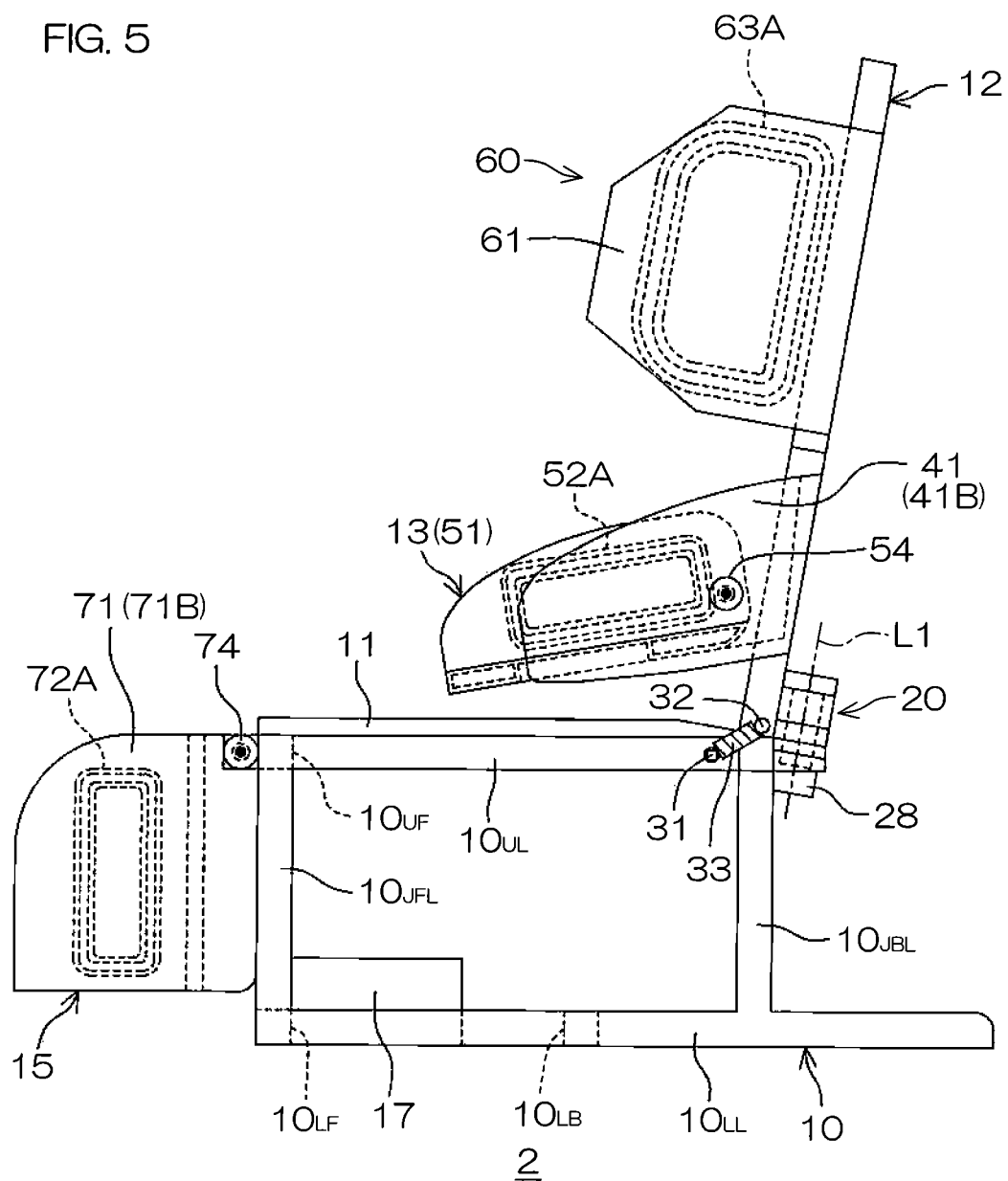
FIG. 5 is a right side view of FIG. 2.
Figure 6:
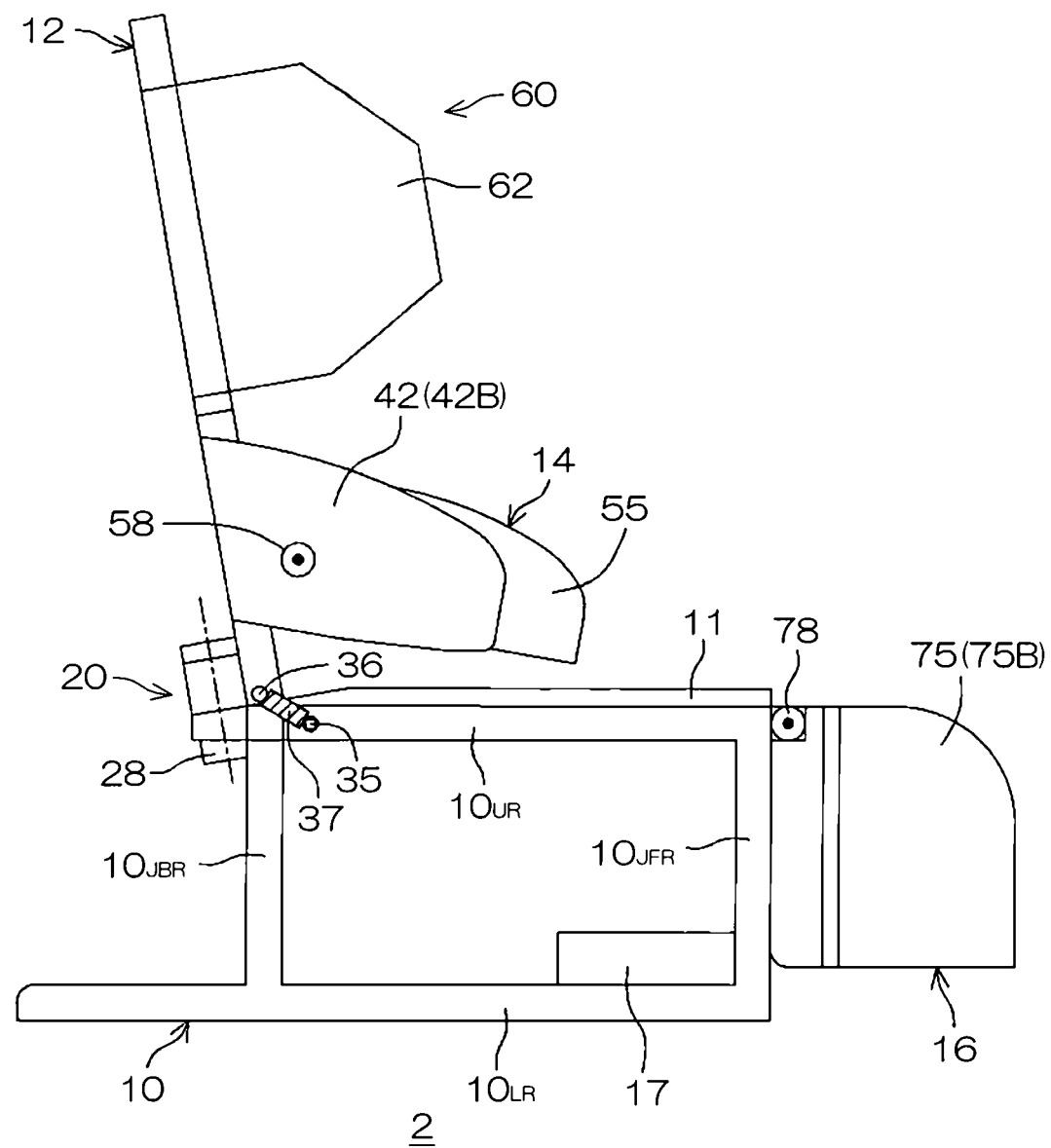
FIG. 6 is a left side view of FIG. 2.
Figure 7:
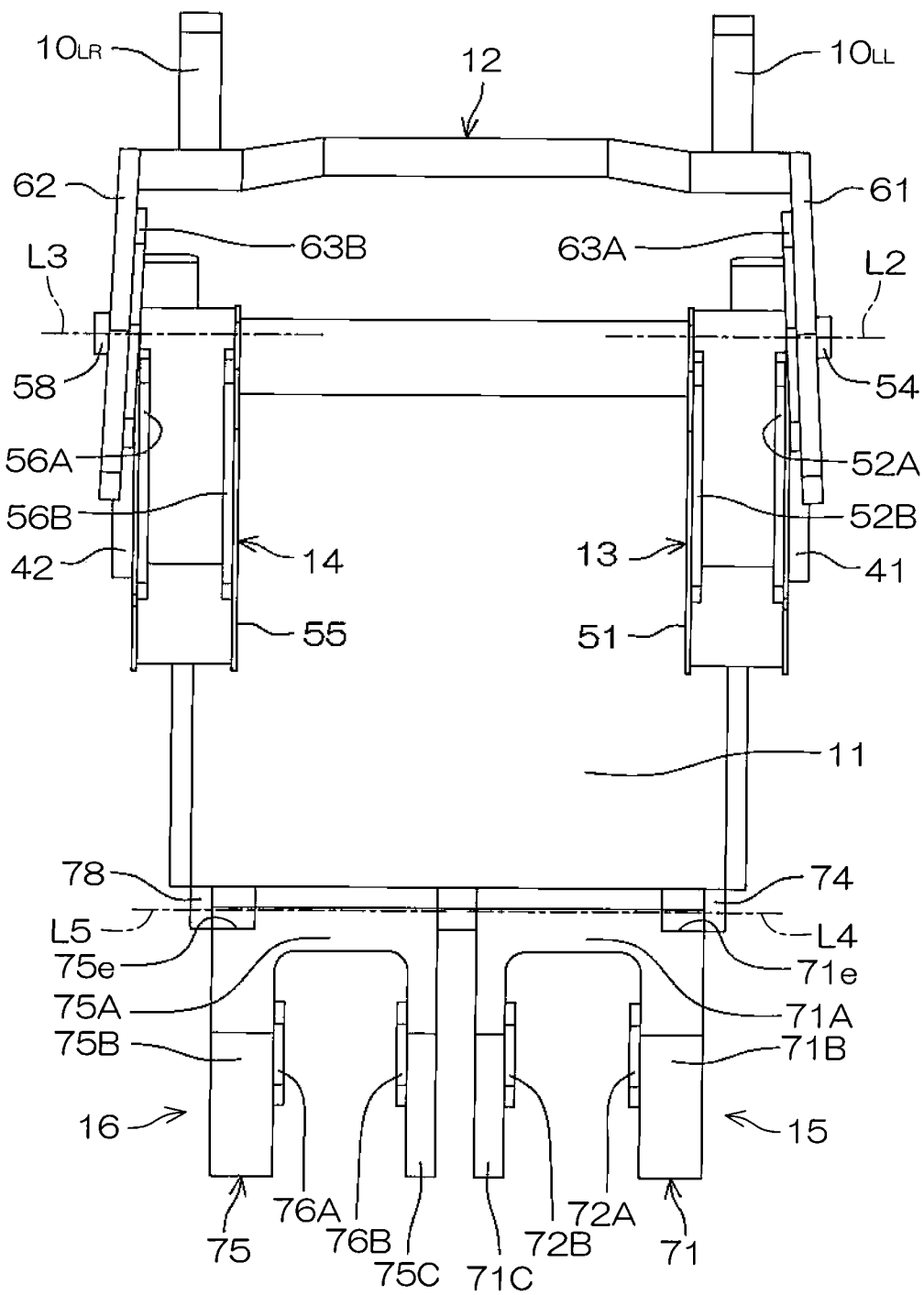
FIG. 7 is a plan view of FIG. 2.
Figure 8:
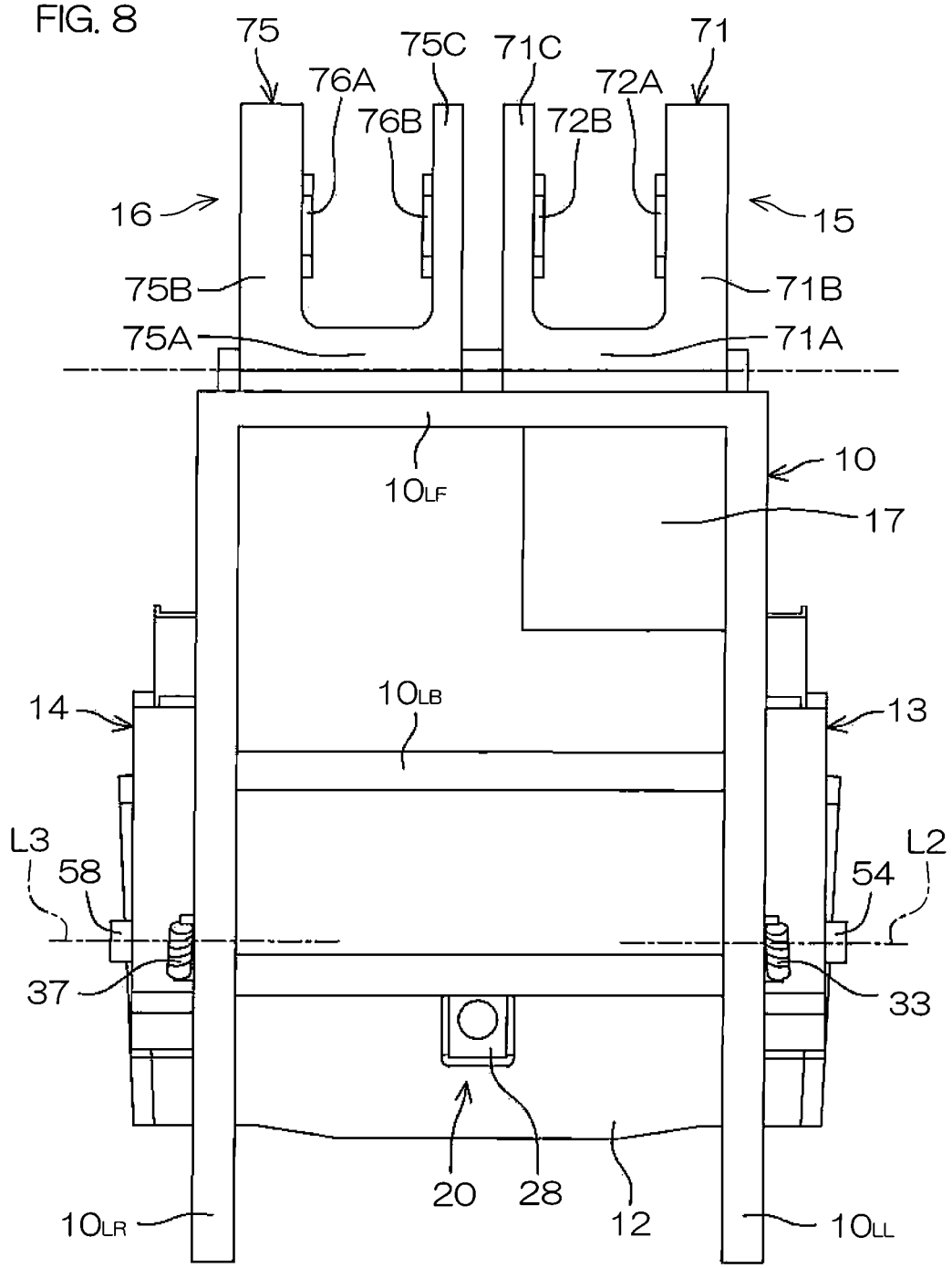
FIG. 8 is a bottom view of FIG. 2.

FIG. 2 is a perspective view of an outer appearance of the controller chair 2. FIG. 3 is a front view of FIG. 2. FIG. 4 is a rear view of FIG. 2. FIG. 5 is a right side view of FIG. 2. FIG. 6 is a left side view of FIG. 2. FIG. 7 is a plan view of FIG. 2. FIG. 8 is a bottom view of FIG. 2.

In the description that follows, a front/rear direction, a right/left direction, and an up/down direction shall respectively refer to a front/rear direction, a right/left direction, and an up/down direction as viewed by the user when the user is seated in an ordinary orientation on the controller chair 2. The right side view of FIG. 5 is a right side view in a case of viewing the controller chair 2 from the front and therefore a left side face of the controller chair 2 appears in FIG. 5. Similarly, the left side view of FIG. 6 is a left side view in a case of viewing the controller chair 2 from the front and therefore a right side face of the controller chair 2 appears in FIG. 6.

Referring to FIG. 2 to FIG. 8, the controller chair 2 includes a seat portion 11, a backrest portion 12, a left arm holding portion 13, a right arm holding portion 14, a left leg holding portion 15, a right leg holding portion 16, and a control unit 17.

The seat portion 11 is arranged from a plate shaped body of rectangular shape in plan view and is provided on a base 10. The base 10 includes four lower frame constituting members constituting a lower frame, four upper frame constituting members constituting an upper frame, and four coupling members coupling the lower frame and the upper frame.

The four lower frame constituting members are constituted of a front side lower frame constituting member $10_{LF}$, a rear side lower frame constituting member $10_{LB}$, a left side lower frame constituting member $10_{LL}$, and a right side lower frame constituting member $10_{LR}$. Lengths of the front side and rear side lower frame constituting members $10_{LF}$ and $10_{LB}$ are substantially equal to a length of the seat portion 11 in the right/left direction. Lengths of the left side and right side lower frame constituting members $10_{LL}$ and $10_{LR}$ are longer than a length of the seat portion 11 in the front/rear direction.

The front side lower frame constituting member $10_{LF}$ couples a front end portion of the left side lower frame constituting member $10_{LL}$ and a front end portion of the right side lower frame constituting member $10_{LR}$. The rear side lower frame constituting member $10_{LB}$ couples a lengthwise intermediate portion of the left side lower frame constituting member $10_{LL}$ and a lengthwise intermediate portion of the right side lower frame constituting member $10_{LR}$.

The four upper frame constituting members are constituted of a front side upper frame constituting member $10_{UF}$, a rear side upper frame constituting member $10_{UB}$, a left side upper frame constituting member $10_{UL}$, and a right side upper frame constituting member $10_{UR}$. Lengths of the front side and rear side upper frame constituting members $10_{UF}$ and $10_{UB}$ are substantially equal to the length of the seat portion 11 in the right/left direction. Lengths of the left side and right side upper frame constituting members $10_{UL}$ and $10_{UR}$ are substantially equal to the length of the seat portion 11 in the front/rear direction.

The front side upper frame constituting member $10_{UF}$ couples a front end portion of the left side upper frame constituting member $10_{UL}$ and a front end portion of the right side upper frame constituting member $10_{UR}$. The rear side upper frame constituting member $10_{UB}$ couples a rear end portion of the left side upper frame constituting member $10_{UL}$ and a rear end portion of the right side upper frame constituting member $10_{UR}$.

The four coupling members are constituted of a front left side coupling member $10_{JFL}$, a front right side coupling member $10_{JFR}$, a rear left side coupling member $10_{JBL}$, and a rear right side coupling member $10_{JBR}$. The front left side coupling member $10_{JFL}$ couples a front left corner portion of the lower frame and a front left corner portion of the upper frame. The front right side coupling member $10_{JFR}$ couples a front right corner portion of the lower frame and a front right corner portion of the upper frame.

The rear left side coupling member $10_{JBL}$ couples a rear left corner portion of the upper frame and a portion of the left side lower frame constituting member $10_{LL}$ corresponding to the corner portion. The rear right side coupling member $10_{JBR}$ couples a rear right corner portion of the upper frame and a portion of the right side lower frame constituting member $10_{LR}$ corresponding to the corner portion.

The backrest portion 12 extends upward and obliquely rearward from a rear edge side of the seat portion 11. The backrest portion 12 is supported, such as to be pivotable around an axis L1 extending along its width direction center line, by the base 10.

Figure 9:
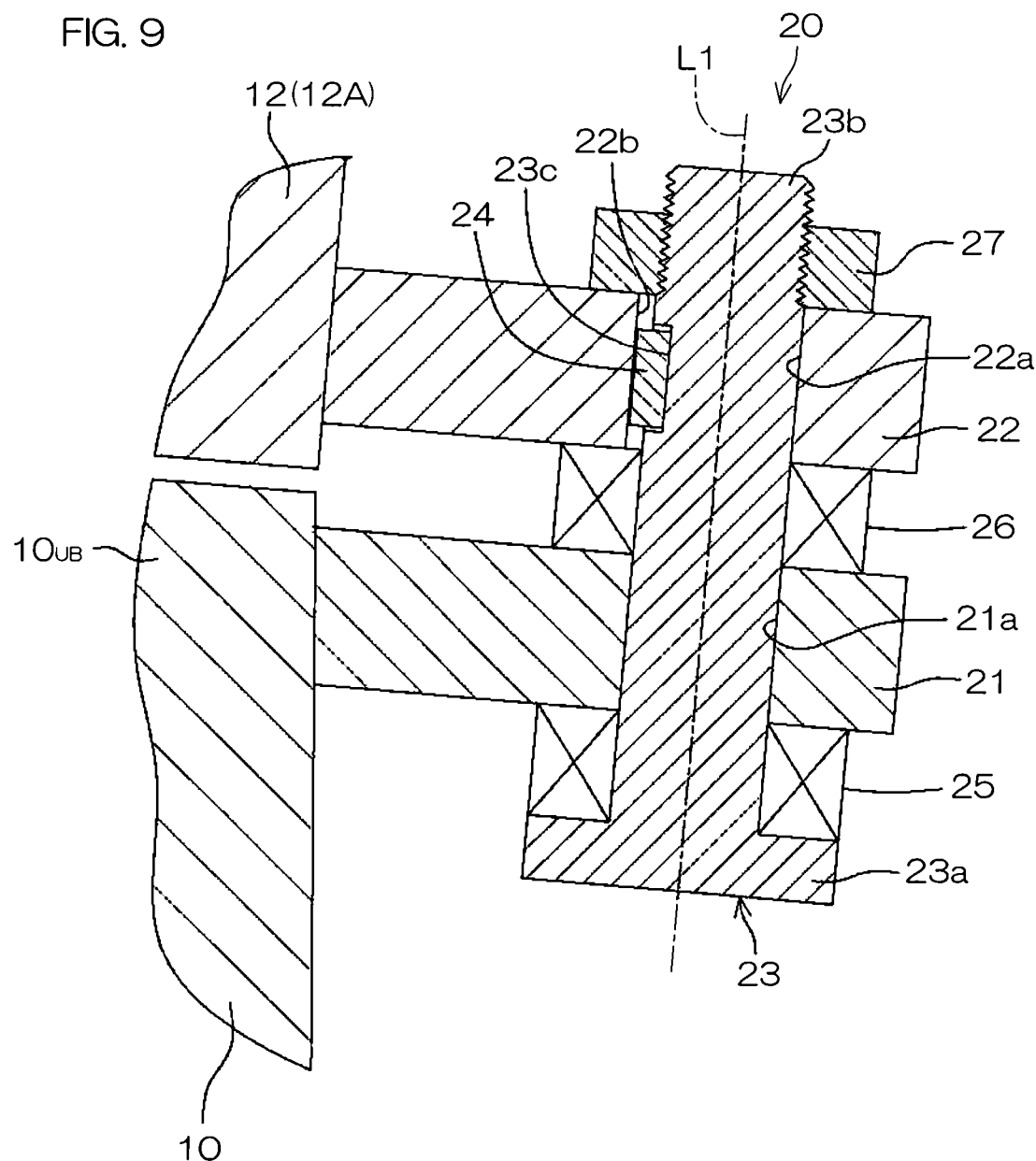
FIG. 9 is a sectional view for describing a mounting structure for mounting a backrest portion to a base.
Figure 10:
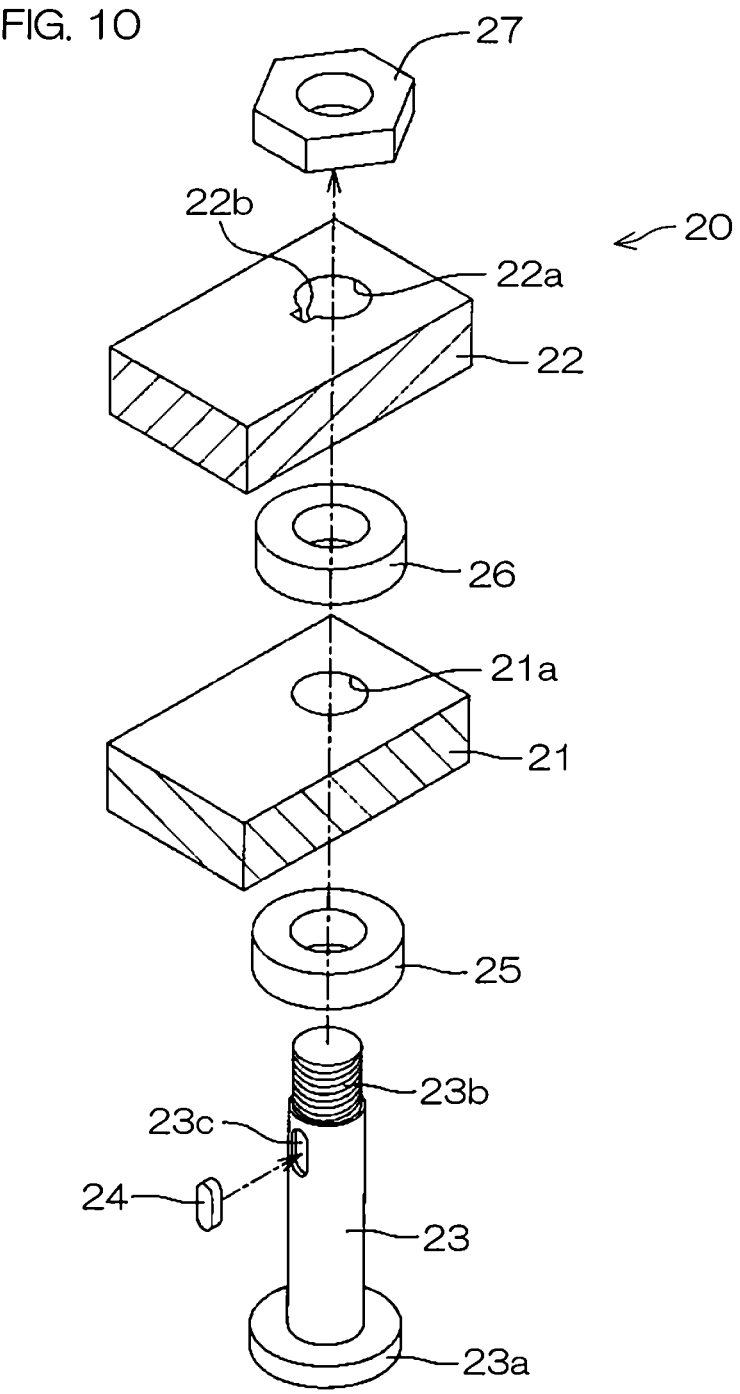
FIG. 10 is an exploded perspective view for describing the mounting structure for mounting the backrest portion to the base.

A mounting structure 20 mounting the back rest portion 12 to the base 10 shall be described with reference to FIG. 4 to FIG. 6 and FIG. 8 to FIG. 10. FIG. 9 is a sectional view for describing the mounting structure 20. FIG. 10 is an exploded perspective view for describing the mounting structure 20.

The mounting structure 20 includes a base side supporting plate 21, a backrest side supporting plate 22, a first rotating shaft 23 penetrating through both supporting plates 21 and 22 in the up/down direction, a key 24 arranged to fix the first rotating shaft 23 to the backrest side supporting plate 22, a pair of upper and lower thrust bearings 26 and 25, and a hexagonal nut 27.

The base side supporting plate 21 is constituted of a rectangular plate shaped body that is long in a substantially front/rear direction in plan view and is fixed to the base 10. Specifically, a front end of the base side supporting plate 21 is fixed to a right/left direction central portion of a rear surface of the rear side upper frame constituting member 10UB. A shaft insertion hole 21a penetrating through in a thickness direction (a substantially up/down direction) is formed in the base side supporting plate 21.

The backrest side supporting plate 22 is constituted of a plate shaped body of substantially the same shape as the base side supporting plate 21 and is fixed to the backrest portion 12. Specifically, a front end of the backrest side supporting plate 22 is fixed to a lower portion width central portion of a back surface of the backrest portion 12. In plan view, the backrest side supporting plate 22 is disposed such as to overlap with the base side supporting plate 21 from directly above. A shaft insertion hole 22a penetrating through in a thickness direction (the substantially up/down direction) is formed in the backrest side supporting plate 22. A key groove 22b extending in the substantially up/down direction is formed in a peripheral wall of the shaft insertion hole 22a.

A flange 23a is formed at a lower end portion of the first rotating shaft 23. A thread portion 23b having a male thread formed on an outer peripheral surface is formed at an upper end portion of the first rotating shaft 23. A key groove 23c is formed in an outer peripheral surface of the first rotating shaft 23.

The first rotating shaft 23 is inserted from below through the shaft insertion hole 21a of the base side supporting plate 21 and the shaft insertion hole 22a of the backrest side supporting plate 22 and the hexagonal nut 27 is screwed onto the thread portion 23b. By the key 24 being fitted into both key grooves 22b and 23c, the backrest side supporting plate 22 is coupled integrally rotatably to the first rotating shaft 23.

The lower thrust bearing 25 is interposed between the flange 23a of the first rotating shaft 23 and the base side supporting plate 21. The upper thrust bearing 26 is interposed between the base side supporting plate 21 and the backrest side supporting plate 22.

By such a mounting structure 20, the backrest portion 12 is supported by the base 10 such as to be rotatable around the axis L1 that is a central axis of the first rotating shaft 23. A first rotation angle sensor 28 arranged to detect a rotation angle of the first rotating shaft 23 (rotation angle of the backrest portion 12) is provided in a vicinity of the first rotating shaft 23. In FIG. 9 and FIG. 10, illustration of the first rotation angle sensor 28 is omitted.

Referring to FIG. 1 to FIG. 8, a first latch portion 31 is mounted to a left side surface rear end portion of the left side upper frame constituting member 10UL of the base 10. A second latch portion 32 of rod shape that projects in the left direction is mounted to a lower end portion of a left side surface of the backrest portion 12. One end of a first free movement preventing spring 33 is latched onto the first latch portion 31 and another end of the first free movement preventing spring 33 is latched onto the second latch portion 32.

Similarly, a third latch portion 35 is mounted to a right side surface rear end portion of the right side upper frame constituting member $10_{UR}$ of the base 10. A fourth latch portion 36 of rod shape that projects in the right direction is mounted to a lower end portion of a right side surface of the backrest portion 12. One end of a second free movement preventing spring 37 is latched onto the third latch portion 35 and another end of the second free movement preventing spring 37 is latched onto the fourth latch portion 36.

By the first free movement preventing spring 33 and the second free movement preventing spring 37, the backrest portion 12 is constantly urged to be in an orientation (neutral position) such that its front surface faces forward. The backrest portion 12 is thereby held in the neutral position when not in use.

The backrest portion 12 includes a backrest lower portion 12A that is substantially a lower half portion and a backrest upper portion 12B that is substantially an upper half portion and has a width wider than a width of the backrest lower portion 12A. When viewed from the front (or the rear), a left side edge and a right side edge of the backrest lower portion 12A are respectively positioned further inward than a downward extension line of a corresponding left side edge of the backrest upper portion 12B and a downward extension line of a corresponding right side edge of the backrest upper portion 12B. A projecting portion 12C projecting upward and obliquely rearward is formed on an upper end portion of the backrest upper portion 12B. The projecting portion 12C has a trapezoidal shape as viewed from the front.

Figure 11:
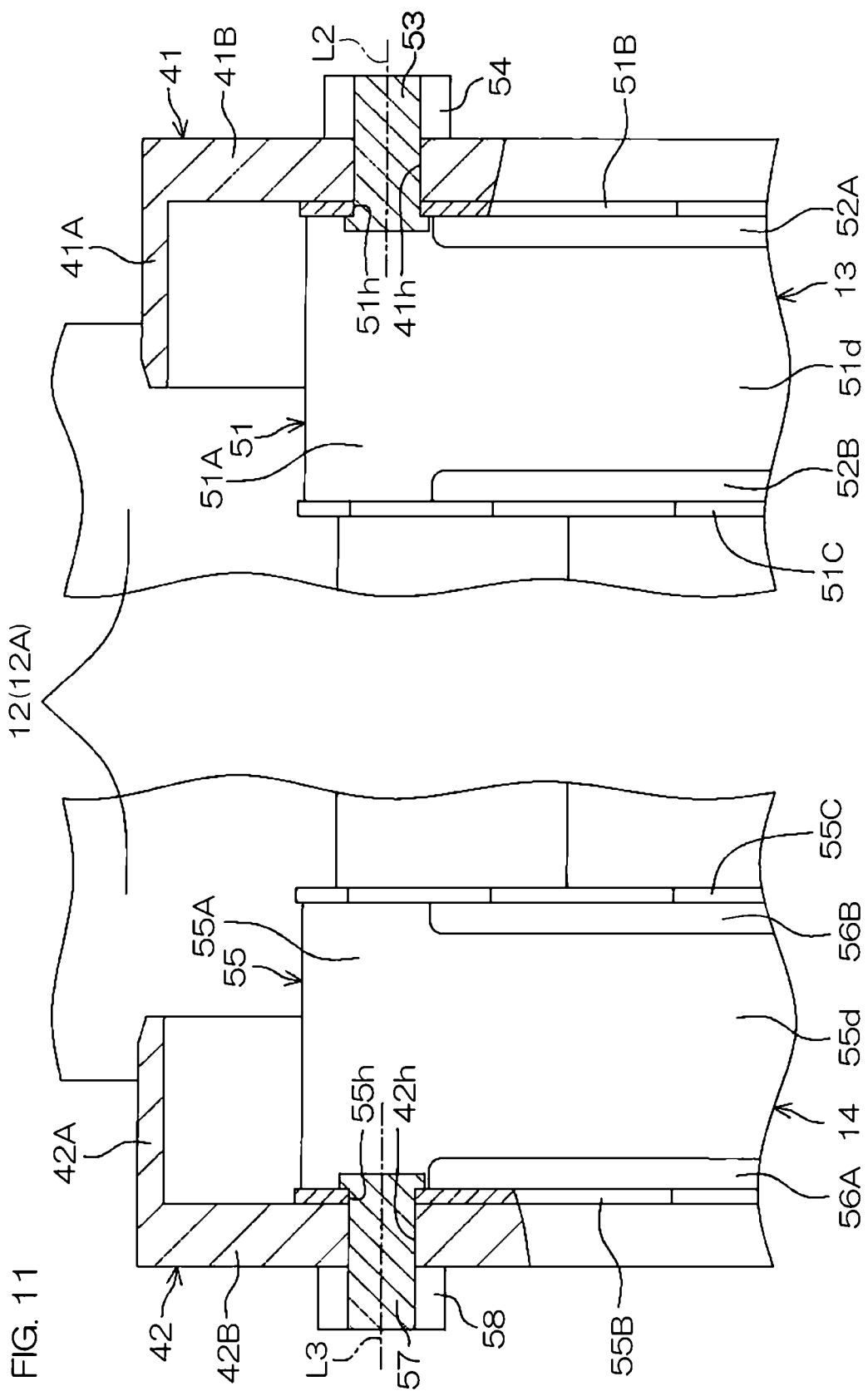
FIG. 11 is a partially enlarged plan view that is partially cutaway to describe mounting structures for mounting a left arm holding portion and a right arm holding portion to the backrest portion.

Arrangements of the left arm holding portion 13 and the right arm holding portion 14 and mounting structures mounting these to the backrest portion 12 shall now be described with reference to FIG. 2 to FIG. 8 and FIG. 11. FIG. 11 is a partially enlarged plan view that is partially cutaway to describe the mounting structures for mounting the left arm holding portion 13 and the right arm holding portion 14 to the backrest portion 12.

A left side supporting member 41 arranged to support the left arm holding portion 13 is mounted to a left side portion of the backrest lower portion 12A. Also, a right side supporting member 42 arranged to support the right arm holding portion 14 is mounted to a right side portion of the backrest lower portion 12A.

The left side supporting member 41 is constituted of a plate shaped body and is constituted of a leftward projecting portion 41A projecting in the left direction from a left side surface of the backrest lower portion 12A and a forward projecting portion 41B projecting forward (to be more accurate, forward and obliquely downward) from a projecting end of the leftward projecting portion 41A. The leftward projecting portion 41A is formed to a rectangular shape as viewed from the front. The forward projecting portion 41B is formed to a substantially rectangular shape that is long in a substantially front/rear direction as viewed from a side. An upper end surface of the forward projecting portion 41B is formed to a curved surface such that gradually approaches a lower end surface of the forward projecting portion 41B toward the front. A shaft insertion hole 41*h* penetrating through in a thickness direction (right/left direction) is formed in the forward projecting portion 41B.

The right side supporting member 42 is constituted of a plate shaped body and is constituted of a rightward projecting portion 42A projecting in the right direction from a right side surface of the backrest lower portion 12A and a forward projecting portion 42B projecting forward (to be more accurate, forward and obliquely downward) from a projecting end of the rightward projecting portion 42A. The rightward projecting portion 42A is formed to a rectangular shape as viewed from the front. The forward projecting portion 42B is formed to a substantially rectangular shape that is long in the substantially front/rear direction as viewed from a side. An upper end surface of the forward projecting portion 42B is formed to a curved surface such that gradually approaches a lower end surface of the forward projecting portion 42B toward the front. A shaft insertion hole 42*h* penetrating through in a thickness direction (right/left direction) is formed in the forward projecting portion 42B.

The left arm holding portion 13 projects forward (to be more accurate, forward and obliquely downward) from the left side portion of the backrest lower portion 12A. The left arm holding portion 13 is supported, such as to be pivotable up and down around its base end portion (rear end portion), by the left side supporting member 41.

The left arm holding portion 13 includes a left armrest portion 51 having a left forearm housing recess 51*d* that extends in the substantially front/rear direction and is open upward and first and second airbags 52A and 52B respectively provided at both side wall inner surfaces of the left forearm housing recess 51*d*. The left armrest portion 51 is constituted of a bottom wall portion 51A of rectangular shape that is long in the substantially front/rear direction in plan view and a pair of right and left side wall portions 51C and 51B respectively raised from both side edges of the bottom wall portion 51A.

The side wall portions 51B and 51C have substantially rectangular shapes that are long in the substantially front/rear direction as viewed from a side. Upper end surfaces of the side wall portions 51B and 51C are formed to curved surfaces such that gradually approach lower end surfaces of the side wall portions 51B and 51C toward the front. Of both side wall portions 51B and 51C, the side wall portion 51B at an outer side (left side) has formed at its rear end portion a shaft insertion hole 51*h* penetrating through the side wall portion 51B in a thickness direction (right/left direction).

The left forearm housing recess 51*d* is formed by the bottom wall portion 51A and the side wall portions 51B and 51C. The first airbag 52A is provided at the inner surface of one of both side wall portions 51B and 51C and the second airbag 52B is provided at the other inner surface. The airbags 52A and 52B are capable of being inflated and deflated and are provided for fixing the left arm of the user to the left armrest portion 51 by inflating them.

A second rotating shaft 53 is inserted through the shaft insertion hole 41*h* of the left side supporting member 41 and the shaft insertion hole 51*h* of the left arm holding portion 13. The second rotating shaft 53 and the left armrest portion 51 are coupled by an unillustrated spline fitting, key fitting, or other coupling structure such as to be integrally rotatable. The left arm holding portion 13 is thereby supported by the backrest portion 12 such as to be rotatable around a central axis L2 of the second rotating shaft 53. A second rotation angle sensor 54 arranged to detect a rotation angle of the second rotating shaft 53 (rotation angle of the left arm holding portion 13) is provided in a vicinity of the second rotating shaft 53.

The right arm holding portion 14 projects forward (to be more accurate, forward and obliquely downward) from the right side portion of the backrest lower portion 12A. The right arm holding portion 14 is supported, such as to be pivotable up and down around its base end portion (rear end portion), by the right side supporting member 42.

The right arm holding portion 14 includes a right armrest portion 55 having a right forearm housing recess 55*d* that extends in the substantially front/rear direction and is open upward and third and fourth airbags 56A and 56B respectively provided at both side wall inner surfaces of the right forearm housing recess 55*d*. The right armrest portion 55 is constituted of a bottom wall portion 55A of rectangular shape that is long in the substantially front/rear direction in plan view and a pair of right and left side wall portions 55B and 55C respectively raised from both side edges of the bottom wall portion 55A.

The side wall portions 55B and 55C have substantially rectangular shapes that are long in the substantially front/rear direction as viewed from a side. Upper end surfaces of the side wall portions 55B and 55C are formed to curved surfaces such that gradually approach lower end surfaces of the side wall portions 55B and 55C toward the front. Of both side wall portions 55B and 55C, the side wall portion 55B at an outer side (right side) has formed at its rear end portion a shaft insertion hole 55*h* penetrating through the side wall portion 55B in a thickness direction (right/left direction).

The right forearm housing recess 55*d* is formed by the bottom wall portion 55A and the side wall portions 55B and 55C. The third airbag 56A is provided at the inner surface of one of both side wall portions 55B and 55C and the fourth airbag 56B is provided at the other inner surface. The airbags 56A and 56B are capable of being inflated and deflated and are provided for fixing the right arm of the user to the right armrest portion 55 by inflating them.

A third rotating shaft 57 is inserted through the shaft insertion hole 42*h* of the right side supporting member 42 and the shaft insertion hole 55*h* of the right arm holding portion 14. The third rotating shaft 57 and the right armrest portion 55 are coupled by an unillustrated spline fitting, key fitting, or other coupling structure such as to be integrally rotatable. The right arm holding portion 14 is thereby supported by the backrest portion 12 such as to be rotatable around a central axis L3 of the third rotating shaft 57. A third rotation angle sensor 58 arranged to detect a rotation angle of the third rotating shaft 57 (rotation angle of the right arm holding portion 14) is provided in a vicinity of the third rotating shaft 57.

Referring to FIG. 2 to FIG. 8, a shoulder fixing portion 60 arranged to fix the shoulders (torso) of the user to the backrest portion 12 is provided at the backrest upper portion 12B. The shoulder fixing portion 60 includes a left shoulder holder 61 mounted to the backrest upper portion 12B, a right shoulder holder 62 mounted to the backrest upper portion 12B, a fifth airbag 63A provided at the left shoulder holder 61 and a sixth airbag 63B provided at the right shoulder holder 62.

The left shoulder holder 61 is constituted of a plate shaped body of substantially rectangular shape as viewed from a side and projects forward from a left side portion of the backrest upper portion 12B. The right shoulder holder 62 is constituted of a plate shaped body of substantially rectangular shape as viewed from a side and projects forward from a right side portion of the backrest upper portion 12B. Two upper and lower corner portions at a front side of each of the left shoulder holder 61 and the right shoulder holder 62 are cut out obliquely.

The fifth airbag 63A is provided at an inner surface (surface facing the right shoulder holder 62) of the left shoulder holder 61. The sixth airbag 63B is provided at an inner surface (surface facing the left shoulder holder 61) of the right shoulder holder 62. The airbags 63A and 63B are capable of being inflated and deflated and are provided for fixing the shoulders of the user between the left shoulder holder 61 and the right shoulder holder 62 via the airbags 63A and 63B by inflating them. By the shoulders of the user thus being fixed between the left shoulder holder 61 and the right shoulder holder 62, the torso of the user is fixed to the backrest portion 12.

Figure 12:
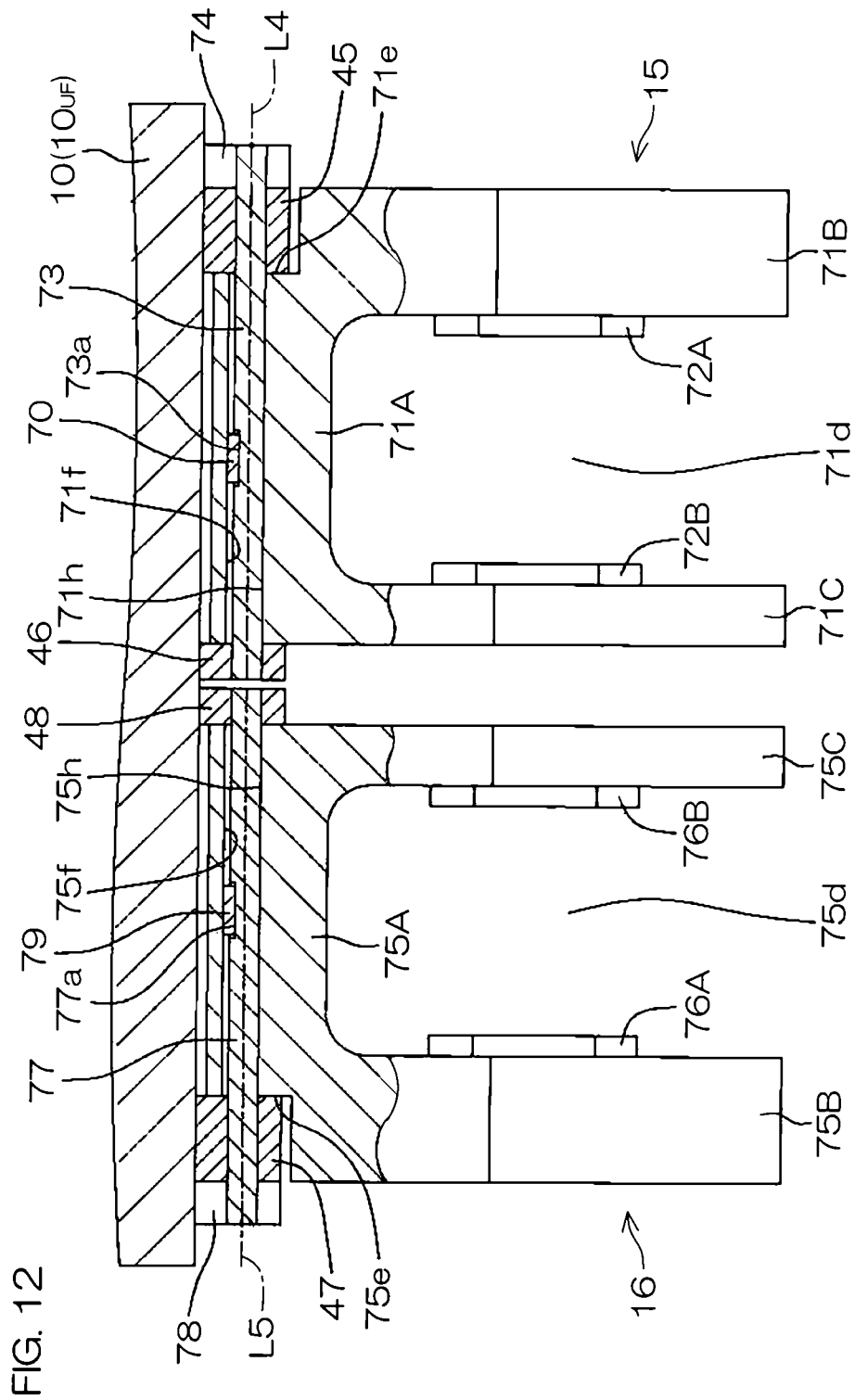
FIG. 12 is a partially enlarged plan view that is partially cutaway to describe mounting structures for mounting a left leg holding portion and a right leg holding portion to the base.

Arrangements of the left leg holding portion 15 and the right leg holding portion 16 and mounting structures mounting these to the base 10 shall now be described with reference to FIG. 2 to FIG. 8 and FIG. 12. FIG. 12 is a partially enlarged plan view that is partially cutaway to describe the mounting structures for mounting the left leg holding portion and the right leg holding portion to the base.

A first bearing member 45 having a shaft insertion hole in the right/left direction is fixed to a left side portion of a front surface of the front side upper frame constituting member $10_{UF}$ of the base 10. A second bearing member 46 having a shaft insertion hole in the right/left direction is fixed to a position at a left side of a length center of the front surface of the front side upper frame constituting member $10_{UF}$ of the base 10. A third bearing member 47 having a shaft insertion hole in the right/left direction is fixed to a right side portion of the front surface of the front side upper frame constituting member $10_{UF}$ of the base 10. A fourth bearing member 48 having a shaft insertion hole in the right/left direction is fixed to a position at a right side of the length center of the front surface of the front side upper frame constituting member $10_{UF}$ of the base 10.

The left leg holding portion 15 extends downward from a vicinity of a left side portion of a front edge of the seat portion 11 at a front side of the base 10. The left leg holding portion 15 is supported, such as to be pivotable up and down around its upper end portion, by the base 10.

The left leg holding portion 15 includes a left leg rest portion 71 having a left lower thigh housing recess 71d that extends in the up/down direction and is open forward and seventh and eighth airbags 72A and 72B respectively provided at both side wall inner surfaces of the left lower thigh housing recess 71d. The left leg rest portion 71 is constituted of a bottom wall portion 71A of rectangular shape that is long in the up/down direction in front view and a pair of right and left side wall portions 71C and 71B respectively projecting forward from both side edges of the bottom wall portion 71A.

The side wall portions 71B and 71C have substantially rectangular shapes that are long in the front/rear direction as viewed from a side. End surfaces of corner portions of front side upper portions of the side wall portions 71B and 71C are formed to outwardly convex curved surfaces. The bottom wall portion 71A has a cutout portion 71e formed by a left side rearward corner portion of its upper portion being cut out. A shaft insertion hole 71h penetrating through the bottom wall portion 71A in the right/left direction and having a left end opening at a leftward facing inner side surface of the cutout portion 71e is formed in the upper portion of the bottom wall portion 71A. A key groove 71f that extends in the right/left direction is formed in a peripheral surface of the shaft insertion hole 71h.

The left lower thigh housing recess 71d is formed by the bottom wall portion 71A and the side wall portions 71B and 71C. The seventh airbag 72A is provided at the inner surface of one of both side wall portions 71B and 71C and the eighth airbag 72B is provided at the other inner surface. The airbags 72A and 72B are capable of being inflated and deflated and are provided for fixing the left lower thigh of the user to the left leg rest portion 71 by inflating them.

A fourth rotating shaft 73 is inserted through the first bearing member 45, the shaft insertion hole 71h of the left leg holding portion 15, and the second bearing member 46. A key groove 73a is formed in an outer peripheral surface of the fourth rotating shaft 73. By a key 70 being fit into both key grooves 71f and 73a, the fourth rotating shaft 73 and the left leg rest portion 71 are coupled such as to be integrally rotatable. The left leg holding portion 15 is thereby supported by the base 10 such as to be rotatable around a central axis L4 of the fourth rotating shaft 73. A fourth rotation angle sensor 74 arranged to detect a rotation angle of the fourth rotating shaft 73 (rotation angle of the left leg holding portion 15) is provided in a vicinity of the fourth rotating shaft 73.

The right leg holding portion 16 extends downward from a vicinity of a right side portion of a front edge of the seat portion 11 at a front side of the base 10. The right leg holding portion 16 is supported, such as to be pivotable up and down around its upper end portion, by the base 10.

The right leg holding portion 16 includes a right leg rest portion 75 having a right lower thigh housing recess 75d that extends in the up/down direction and is open forward and ninth and tenth airbags 76A and 76B respectively provided at both side wall inner surfaces of the right lower thigh housing recess 75d. The right leg rest portion 75 is constituted of a bottom wall portion 75A of rectangular shape that is long in the up/down direction in front view and a pair of right and left side wall portions 75B and 75C respectively projecting forward from both side edges of the bottom wall portion 75A.

The side wall portions 75B and 75C have substantially rectangular shapes that are long in the front/rear direction as viewed from a side. End surfaces of corner portions of front side upper portions of the side wall portions 75B and 75C are formed to outwardly convex curved surfaces. The bottom wall portion 75A has a cutout portion 75*e* formed by a right side rearward corner portion of its upper portion being cut out. A shaft insertion hole 75*h* penetrating through the bottom wall portion 75A in the right/left direction and having a right end opening at a rightward facing inner side surface of the cutout portion 75*e* is formed in the upper portion of the bottom wall portion 75A. A key groove 75*f* that extends in the right/left direction is formed in a peripheral surface of the shaft insertion hole 75*h*.

The right lower thigh housing recess 75*d* is formed by the bottom wall portion 75A and the side wall portions 75B and 75C. The ninth airbag 76A is provided at the inner surface of one of both side wall portions 75B and 75C and the tenth airbag 76B is provided at the other inner surface. The airbags 76A and 76B are capable of being inflated and deflated and are provided for fixing the right lower thigh of the user to the right leg rest portion 75 by inflating them.

A fifth rotating shaft 77 is inserted through the third bearing member 47, the shaft insertion hole 75*h* of the right leg holding portion 16, and the fourth bearing member 48. A key groove 77*a* is formed in an outer peripheral surface of the fifth rotating shaft 77. By a key 79 being fit into both key grooves 75*f* and 77*a*, the fifth rotating shaft 77 and the right leg rest portion 75 are coupled such as to be integrally rotatable. The right leg holding portion 16 is thereby supported by the base 10 such as to be rotatable around a central axis L5 of the fifth rotating shaft 77. A fifth rotation angle sensor 78 arranged to detect a rotation angle of the fifth rotating shaft 77 (rotation angle of the right leg holding portion 16) is provided in a vicinity of the fifth rotating shaft 77.

As shown in FIG. 4 to FIG. 6 and FIG. 8, the control unit 17 is mounted to the base 10. The control unit 17 controls the first to tenth airbags 52A, 52B, 56A, 56B, 63A, 63B, 72A, 72B, 76A, and 76B. The control unit 17 and the first to tenth airbags 52A, 52B, 56A, 56B, 63A, 63B, 72A, 72B, 76A, and 76B are connected via air tubes that are not shown in FIG. 2 to FIG. 8.

A remote controller 18 (see FIG. 13) is connected via an electric cable to the control unit 17. The remote controller 18 is arranged for the user to operate the controller chair 2. The remote controller 18 is provided with one or a plurality of operation keys, etc. With the present preferred embodiment, it shall be deemed for convenience of description that the remote controller 18 is provided with an on key for generating an on command and an off key for generating an off command.

Figure 13:
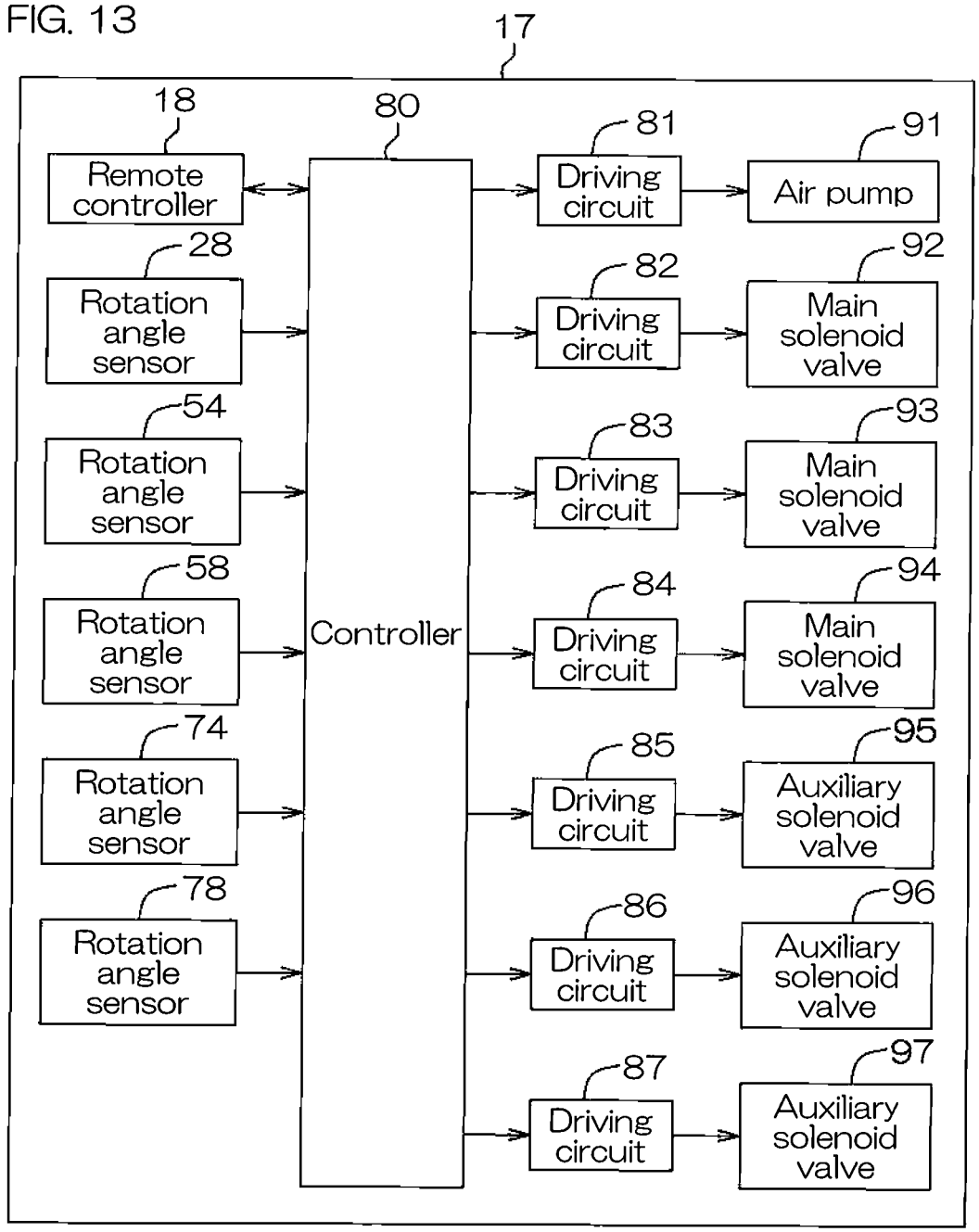
FIG. 13 is a block diagram of the electrical configuration of the controller chair.
Figure 14:
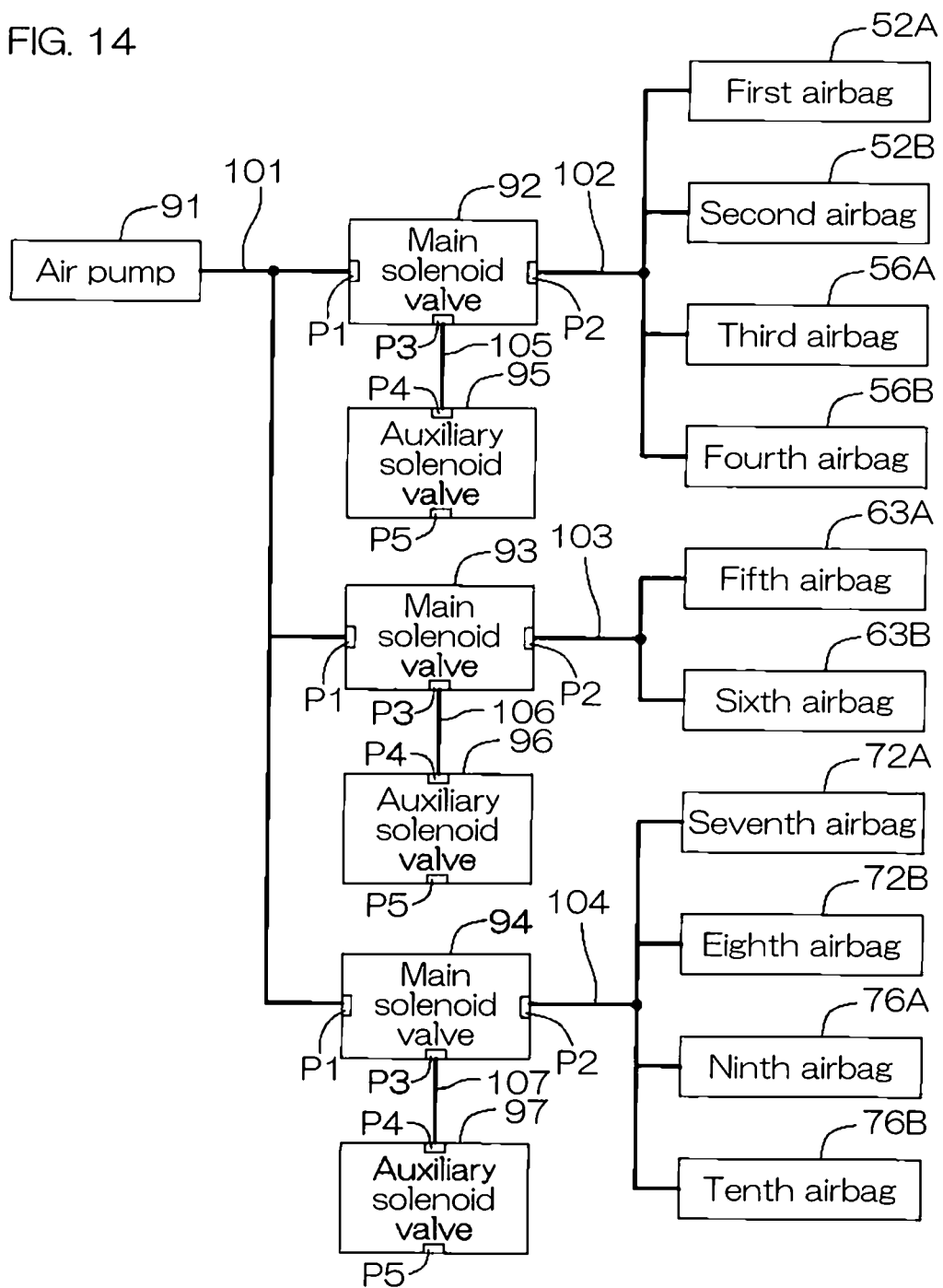
FIG. 14 is an air circuit diagram of an air circuit from an air pump to respective airbags.

FIG. 13 is a block diagram of the arrangement of the control unit 17. FIG. 14 is an air circuit diagram of an air circuit from an air pump to the respective airbags.

The control unit 17 includes the air pump 91, first, second, and third main solenoid valves 92, 93, and 94, first, second, and third auxiliary solenoid valves 95, 96, and 97, a controller 80, and a plurality of driving circuits 81, 82, 83, 84, 85, 86, and 87. As shown in FIG. 14, each of the main solenoid valves 92, 93, and 94 is constituted of a three-port solenoid valve having an input port P1, an output port P2, and an exhaust port P3. As shown in FIG. 14, each of the auxiliary solenoid valves 95, 96, and 97 is constituted of a self-holding type two-port solenoid valve (on-off valve) having an input port P4 and an output port P5. In the present preferred embodiment, each of the auxiliary solenoid valves 95, 96, and 97 is constituted of a double-solenoid type self-holding valve having an opening coil and a closing coil.

The plurality of driving circuits 81 to 87 include the driving circuit 81 for the air pump 91, the driving circuits 82, 83, and 84 for the first, second, and third main solenoid valves 92, 93, and 94, and the driving circuits 85, 86, and 87 for the first, second, and third auxiliary solenoid valves 95, 96, and 97.

The controller 80 includes a microcomputer. The microcomputer includes a CPU, a memory (RAM, ROM, or nonvolatile memory), etc. In addition to a program for the CPU, various data are stored in the memory. The remote controller 18, the first to fifth rotation angle sensors 28, 54, 58, 74, and 78, and the respective driving circuits 81 to 87 are connected to the controller 80. As each of the first to fifth rotation angle sensors 28, 54, 58, 74, and 78, for example, a rotary encoder or other rotation angle sensor can be used. In the present preferred embodiment, a quadrature encoder is used as each of the first to fifth rotation angle sensors 28, 54, 58, 74, and 78.

Referring to FIG. 14, the air pump 91 is connected to the input ports P1 of the first, second, and third main solenoid valves 92, 93, and 94 via an air tube 101. The output port P2 of the first main solenoid valve 92 is connected to the first to fourth airbags 52A, 52B, 56A, and 56B via an air tube 102. The output port P2 of the second main solenoid valve 93 is connected to the fifth and sixth airbags 63A and 63B via an air tube 103. The output port P2 of the third main solenoid valve 94 is connected to the seventh to tenth airbags 72A, 72B, 76A, and 76B via an air tube 104.

The exhaust ports P3 of the first, second, and third main solenoid valves 92, 93, and 94, are respectively connected to the input ports P4 of the first, second, and third auxiliary solenoid valves 95, 96, and 97 via air tubes 105, 106, and 107.

Returning to FIG. 13, the controller 80 drives and controls the driving circuits 81 to 87 based on the on command or the off command from the remote controller 18 to control the pump 91 and the solenoid valves 92 to 97. A method of control of the pump 91 and the solenoid valves 92 to 97 by the controller 80 shall now be described specifically.

Normally, the pump 91 is in an off state, the input port P1 and the output port P2 of each of the main solenoid valves 92 to 94 are in a non-connected state, the output port P2 and the exhaust port P3 of each of the main solenoid valves 92 to 94 are in a connected state, and the auxiliary solenoid valves 95 to 97 are in open states.

When the on command is input from the remote controller 18, the controller 80 drives the pump 91, energizes coils of all main solenoid valves 92 to 94, and energizes the closing coils of all auxiliary solenoid valves 95 to 97. Thereby, the input port P1 and the output port P2 of each of the main solenoid valves 92 to 94 are put in a connected state, the output port P2 and the exhaust port P3 of each of the main solenoid valves 92 to 94 are put in a non-connected state, and the respective auxiliary solenoid valves 95 to 97 are put in closed states.

Air is thereby supplied from the air pump 91 to the first to fourth airbags 52A, 52B, 56A, and 56B via the air tube 101, the first main solenoid valve 92, and the air tube 102. Also, air is supplied from the air pump 91 to the fifth and sixth airbags 63A and 63B via the air tube 101, the second main solenoid valve 93, and the air tube 103. Further, air is supplied from the air pump 91 to the seventh to tenth airbags 72A, 72B, 76A, and 76B via the air tube 101, the third main solenoid valve 94, and the air tube 104.

All airbags 52A, 52B, 56A, 56B, 63A, 63B, 72A, 72B, 76A, and 76B are thereby inflated.

When a predetermined time elapses from when the on command is input, the controller 80 stops driving of the pump 91, stops energization of the coils of all main solenoid valves 92 to 94, and stops energization of the closing coils of all auxiliary solenoid valves 95 to 97. The predetermined time is set to a time appropriate for all airbags 52A, 52B, 56A, 56B, 63A, 63B, 72A, 72B, 76A, and 76B to be put in inflated states. Thereby, the input port P1 and the output port P2 of each of the main solenoid valves 92 to 94 are put in the non-connected state and the output port P2 and the exhaust port P3 of each of the main solenoid valves 92 to 94 are put in the connected state.

The respective auxiliary solenoid valves 95 to 97 hold the closed states even when the energization of the closing coils is stopped and therefore the respective airbags 52A, 52B, 56A, 56B, 63A, 63B, 72A, 72B, 76A, and 76B are maintained in the inflated states.

Thereafter, when the off command is input from the remote controller 18, the controller 80 energizes the opening coils of all auxiliary solenoid valves 95, 96, and 97 for just a predetermined short time. The respective auxiliary solenoid valves 95, 96, and 97 are thereby put in the open states. Even when the energization of the opening coils is stopped, the respective auxiliary solenoid valves 95, 96, and 97 hold the open states.

The air inside the first to fourth airbags 52A, 52B, 56A, and 56B is thereby exhausted to the exterior via the air tube 102, the first main solenoid valve 92, the air tube 105, and the first auxiliary solenoid valve 95. Also, the air inside the fifth and sixth airbags 63A and 63B is exhausted to the exterior via the air tube 103, the second main solenoid valve 93, the air tube 106, and the second auxiliary solenoid valve 96. Further, the air inside the seventh to tenth airbags 72A, 72B, 76A, and 76B is exhausted to the exterior via the air tube 104, the third main solenoid valve 94, the air tube 107, and the third auxiliary solenoid valve 97.

All airbags 52A, 52B, 56A, 56B, 63A, 63B, 72A, 72B, 76A, and 76B are thereby deflated.

From when the on command is input until the off command is input, the controller 80 calculates and outputs the rotation angles (rotation amounts from reference positions of the rotating shafts) and rotation directions of the first rotating shaft 23, the second rotating shaft 53, the third rotating shaft 57, the fourth rotating shaft 74, and the fifth rotating shaft 78 based on the output signals from the first to fifth rotation angle sensors 28, 54, 58, 74, and 78.

The user sits on the controller chair 2 and puts the left lower thigh into the left leg rest portion 71 and puts the right lower thigh into the right leg rest portion 75. Also, the user puts the left forearm into the left armrest portion 51 and puts the right forearm into the right armrest portion 55. The user then operates the on key of the remote controller 18. All airbags 52A, 52B, 56A, 56B, 63A, 63B, 72A, 72B, 76A, and 76B are thereby inflated and therefore the left lower thigh, the right lower thigh, the left forearm, and the right forearm become fixed in the left leg rest portion 71, the right leg rest portion 75, the left armrest portion 51, and the right armrest portion 55, respectively. Also, the shoulders become fixed between the left shoulder holder 61 and the right shoulder holder 62.

When in this state, the user moves the left arm, the left arm holding portion 13 can be pivoted around the axis L2 as shown in FIG. 15. Similarly, when the user moves the right arm, the right arm holding portion 14 can be pivoted around the axis L3.

Also, when the user moves the left leg, the left leg holding portion 15 can be pivoted around the axis L4 as shown in FIG. 15. Similarly, when the user moves the right leg, the right leg holding portion 16 can be pivoted around the axis L5.

Figure 16A:
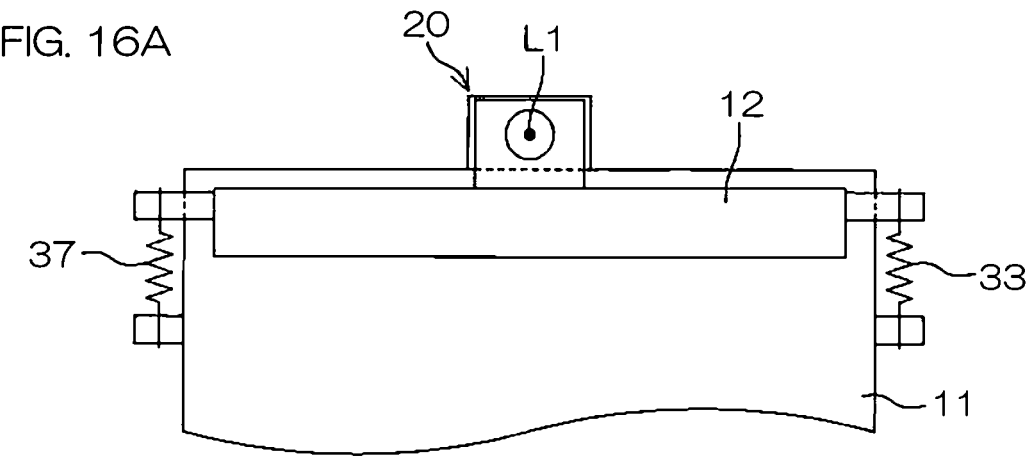
FIG. 16A is a schematic plan view of a state in which the backrest portion is at a neutral position.
Figure 16B:
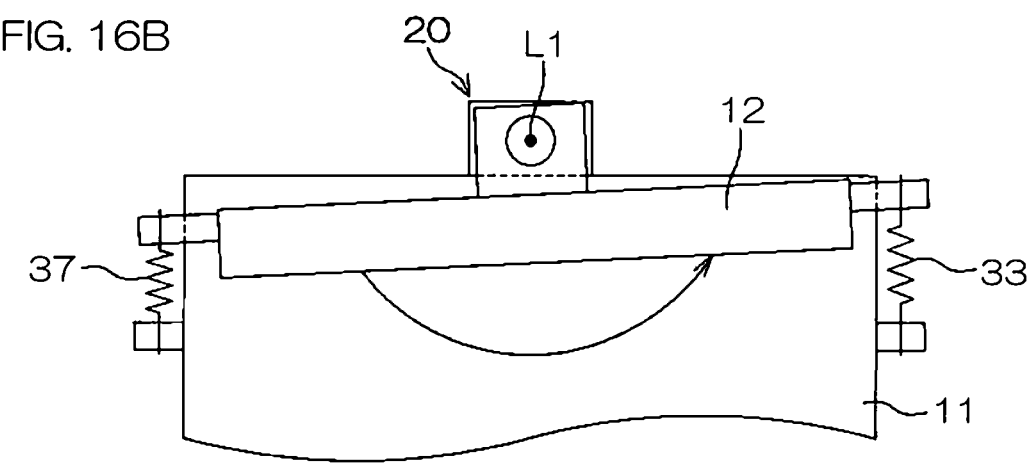
FIG. 16B is a schematic plan view of a state in which the backrest portion is rotated in a counterclockwise direction.
Figure 16C:
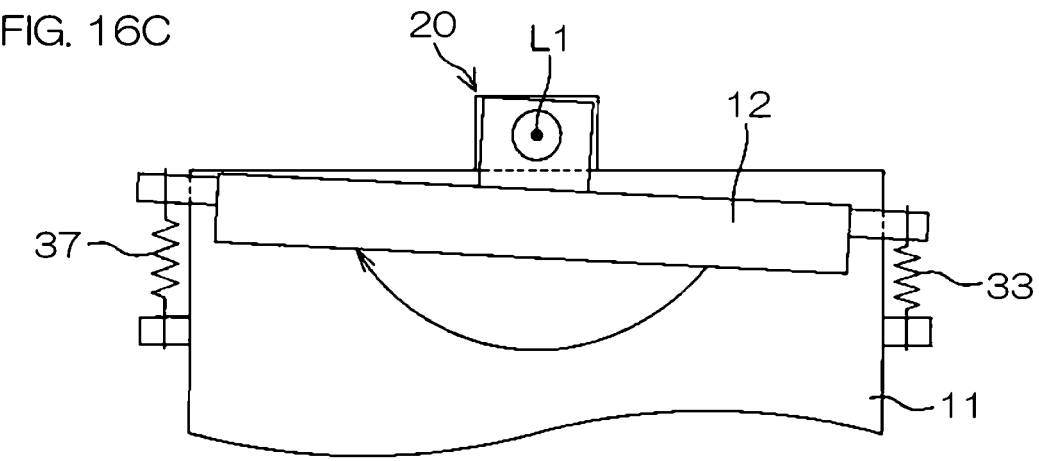
FIG. 16C is a schematic plan view of a state in which the backrest portion is rotated in a clockwise direction.

Also, when the user moves the shoulders (torso), the backrest portion 12 can be pivoted around the axis L1 as shown in FIG. 16A, FIG. 16B, and FIG. 16C.

Movements of the shoulders (torso), the left arm, the right arm, the left leg, and the right leg of the user are detected by the first to fifth rotation angle sensors 28, 54, 58, 74, and 78 and output from the controller 80 as signals expressing the movements of the respective portions (signals expressing the rotation angles and the rotation directions).

At the end of operation, the user operates the off key of the remote controller 18. All airbags 52A, 52B, 56A, 56B, 63A, 63B, 72A, 72B, 76A, and 76B are thereby deflated and the user can thus easily remove the left lower thigh, the right lower thigh, the left forearm, and the right forearm from the left leg rest portion 71, the right leg rest portion 75, the left armrest portion 51, and the right armrest portion 55, respectively. Also, the user can easily remove the shoulders from between the left shoulder holder 61 and the right shoulder holder 62.

By the controller chair 2 described above, the signals that are in accordance with the respective movements of the torso, the left arm, the right arm, the left leg, and the right leg of the user can be generated.

Although a preferred embodiment of the present invention has been described above, the present invention may also be implemented in yet other modes. For example, in the preferred embodiment described above, the first free movement preventing spring 33 and the second free movement preventing spring 37 for urging the backrest portion 12 to the neutral position with respect to the base 10 are arranged from tension coil springs that urge the lower end portions of both side surfaces of the backrest portion 12 forward. However, the first free movement preventing spring and the second free movement preventing spring for urging the backrest portion 12 to the neutral position may, as shown in FIG. 17, be a pair of right and left compression coil springs 33A and 37A for urging both side portions of a back surface lower portion of the backrest portion 12 forward with respect to the base 10.

Specifically, a supporting member 111 is mounted to a left side portion of a rear surface upper end portion of the rear side upper frame constituting member $10_{UB}$ of the base 10. The supporting member 111 is constituted of a plate shaped body and includes a fixed portion 111A fixed to the rear surface of the upper frame constituting member $10_{UB}$, a traverse portion 111B extending substantially rearward from an upper end of the fixed portion 111A, and a rising portion 111C extending substantially upward from a rear end of the traverse portion 111B. The first free movement preventing spring 33A constituted of the compression spring is interposed between a left side portion of a rear surface lower portion of the backrest portion 12 and the rising portion 111C of the supporting member 111.

A supporting member 112 is mounted to a right side portion of the rear surface upper end portion of the rear side upper frame constituting member $10_{UB}$ of the base 10. The supporting member 112 is constituted of a plate shaped body and includes a fixed portion 112A fixed to the rear surface of the upper frame constituting member $10_{UB}$, a traverse portion 112B extending substantially rearward from an upper end of the fixed portion 112A, and a rising portion 112C extending substantially upward from a rear end of the traverse portion 112B. The second free movement preventing spring 37A constituted of the compression spring is interposed between a right side portion of the rear surface lower portion of the backrest portion 12 and the rising portion 112C of the supporting member 112.

Figure 17:
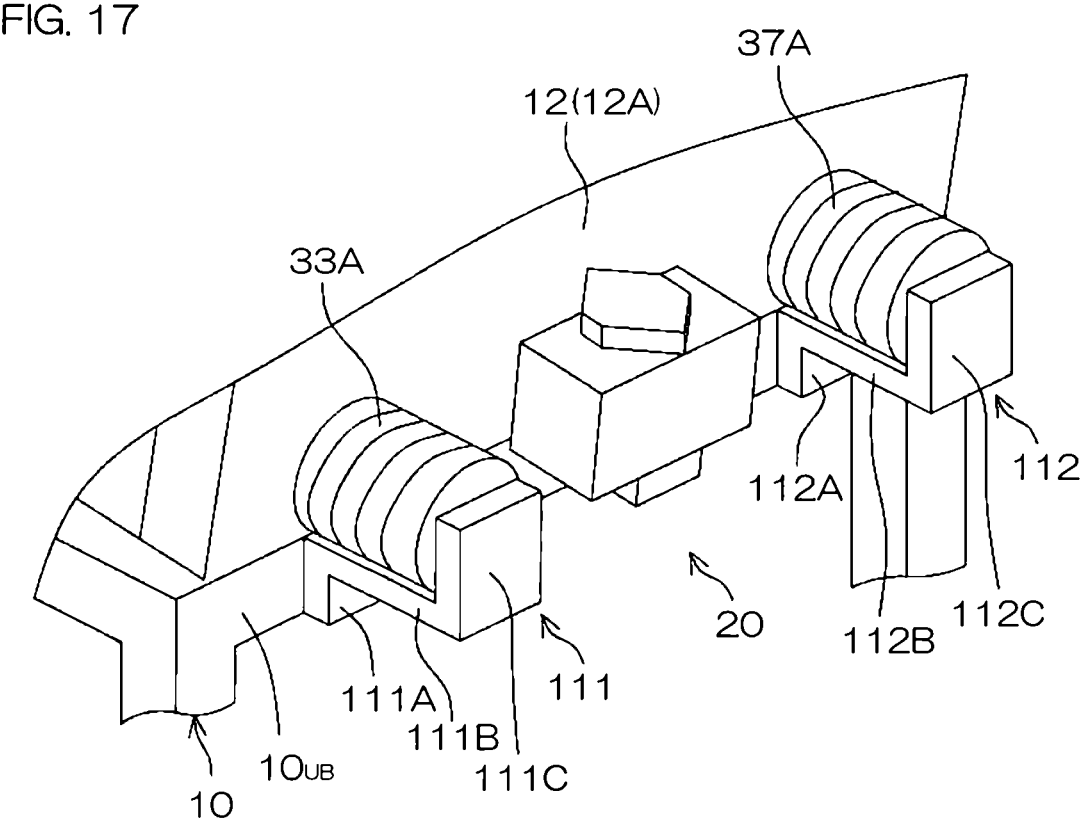
FIG. 17 is a partially enlarged perspective view of another arrangement example for urging the backrest portion to the neutral position.
Figure 18A:
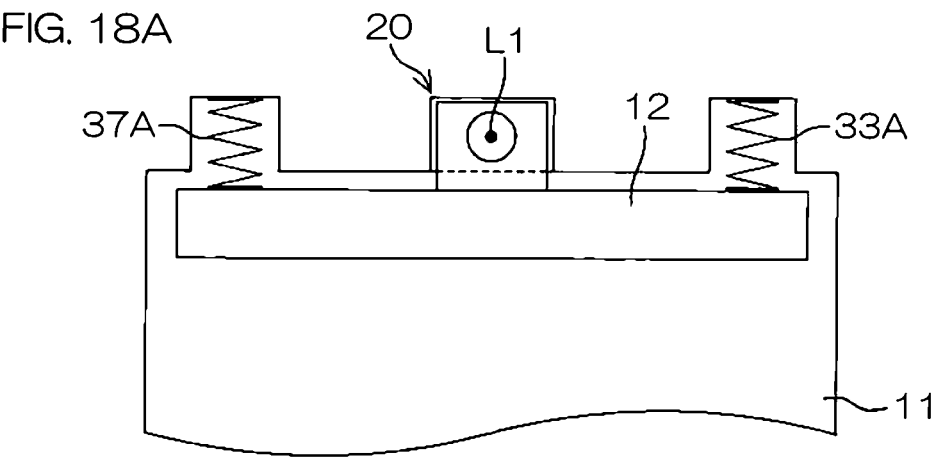
FIG. 18A is a schematic plan view of a state in which the backrest portion is at the neutral position in the arrangement example of FIG. 17.
Figure 18B:
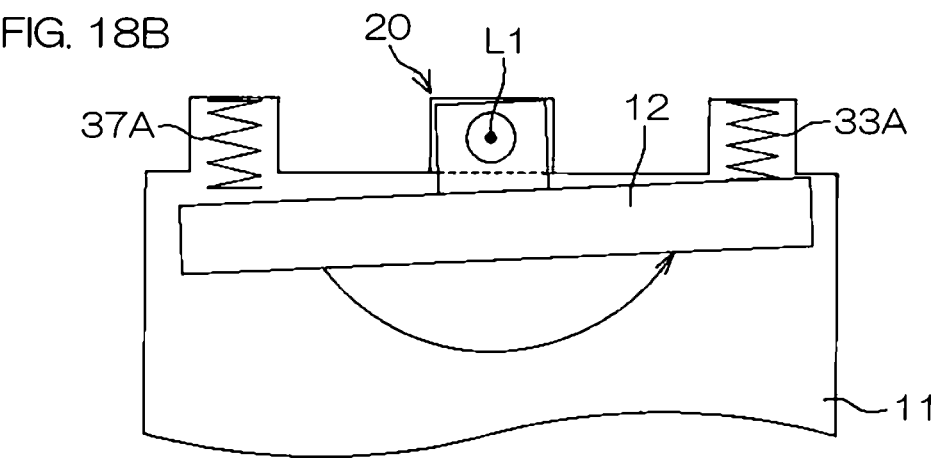
FIG. 18B is a schematic plan view of a state in which the backrest portion is rotated in a counterclockwise direction in the arrangement example of FIG. 17.
Figure 18C:
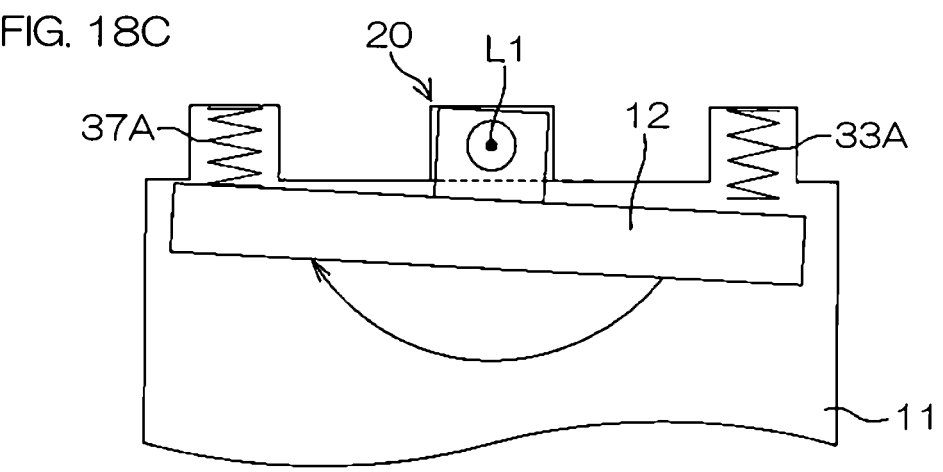
FIG. 18C is a schematic plan view of a state in which the backrest portion is rotated in a clockwise direction in the arrangement example of FIG. 17.

When, in a case where the free movement preventing springs 33A and 37A such as shown in FIG. 17 are used, the user moves, for example, the shoulders (torso), the backrest portion 12 can be pivoted around the axis L1 as shown in FIG. 18A, FIG. 18B, and FIG. 18C.

Also, although in the preferred embodiment described above, the airbags 52A and 52B are provided respectively at the inner surfaces of both side walls of the left forearm housing recess 51d, an airbag may be provided at just one of either of the inner surfaces of both side walls of the left forearm housing recess 51d. Similarly, an airbag may be provided at just one of either of the inner surfaces of both side walls of the right forearm housing recess 55d.

Similarly, an airbag may be provided at just one of either of the inner surfaces of both side walls of the left lower thigh housing recess 71d. Similarly, an airbag may be provided at just one of either of the inner surfaces of both side walls of the right lower thigh housing recess 75d.

Also, with the preferred embodiment described above, three pairs of the main solenoid valves 92 to 94 and the auxiliary solenoid valves 95 to 97 are provided. However, just one pair of a main solenoid valve and an auxiliary solenoid valve may be provided in common for all of the airbags. Also, the respective airbags may each be provided with one pair of a main solenoid valve and an auxiliary solenoid valve. Also, all of the airbags may be divided into any groups differing from those of the preferred embodiment described above and a pair of a main solenoid valve and an auxiliary solenoid valve may be provided according to each group.

The present application corresponds to Japanese Patent Application No. 2019-43025 filed on Mar. 8, 2019 in the Japan Patent Office, and the entire disclosure of this application is incorporated herein by reference.

While preferred embodiments of the present invention have been described above, it is to be understood that variations and modifications will be apparent to those skilled in the art without departing the scope and sprit of the present invention. The scope of the present invention, therefore, is to be determined solely by the following claims.

What is claimed is:

1. A controller chair comprising:
a seat portion supported by a base;
a backrest portion extending upward or obliquely upward from a rear edge side of the seat portion and supported by the base, such as to be pivotable around an axis extending upwardly or obliquely upwardly along a center line in a width direction of the backrest portion;
a left arm holding portion projecting forward from a left side portion of the backrest portion and supported by the backrest portion, such as to be pivotable up and down around base end portion of the left arm holding portion;
a right arm holding portion projecting forward from a right side portion of the backrest portion and supported by the backrest portion, such as to be pivotable up and down around base end portion of the right arm holding portion;
a left leg holding portion extending downward from a vicinity of a left side portion of a front edge of the seat portion at a front side of the base and supported by the base, such as to be pivotable up and down around upper end portion of the left leg holding portion;
a right leg holding portion extending downward from a vicinity of a right side portion of the front edge of the seat portion at the front side of the base and supported by the base, such as to be pivotable up and down around upper end portion of the right leg holding portion; and
a first rotation angle detecting portion, a second rotation angle detecting portion, a third rotation angle detecting portion, a fourth rotation angle detecting portion, and a fifth rotation angle detecting portion detecting respective rotation angles of the backrest portion, the left arm holding portion, the right arm holding portion, the left leg holding portion, and the right leg holding portion.

2. The controller chair according to claim 1, wherein the left arm holding portion includes a left forearm housing recess and a left arm fixing airbag capable of being inflated and deflated and provided at least at one of either of both side wall inner surfaces of the left forearm housing recess, and
the right arm holding portion includes a right forearm housing recess and a right arm fixing airbag capable of being inflated and deflated and provided at least at one of either of both side wall inner surfaces of the right forearm housing recess.

3. The controller chair according to claim 2, wherein the left leg holding portion includes a left lower thigh housing recess and a left leg fixing airbag capable of being inflated and deflated and provided at least at one of either of both side wall inner surfaces of the left lower thigh housing recess, and
the right leg holding portion includes a right lower thigh housing recess and a right leg fixing airbag capable of being inflated and deflated and provided at least at one of either of both side wall inner surfaces of the right lower thigh housing recess.

4. The controller chair according to claim 3, further comprising: a shoulder fixing portion provided at the backrest portion and arranged to fix the shoulders of the user to the backrest portion; and
wherein the shoulder fixing portion includes
a left shoulder holder projecting forward from a left side portion of the backrest portion further upward than a portion coupled to the left arm holding portion,
a right shoulder holder projecting forward from a right side portion of the backrest portion further upward than a portion coupled to the right arm holding portion,
a left shoulder pressing airbag capable of being inflated and deflated and provided at a surface of the left shoulder holder facing the right shoulder holder, and
a right shoulder pressing airbag capable of being inflated and deflated and provided at a surface of the right shoulder holder facing the left shoulder holder.

5. The controller chair according to claim 2, further comprising: a shoulder fixing portion provided at the backrest portion and arranged to fix the shoulders of the user to the backrest portion; and
wherein the shoulder fixing portion includes
a left shoulder holder projecting forward from a left side portion of the backrest portion further upward than a portion coupled to the left arm holding portion,
a right shoulder holder projecting forward from a right side portion of the backrest portion further upward than a portion coupled to the right arm holding portion,
a left shoulder pressing airbag capable of being inflated and deflated and provided at a surface of the left shoulder holder facing the right shoulder holder, and a right shoulder pressing airbag capable of being inflated and deflated and provided at a surface of the right shoulder holder facing the left shoulder holder.

6. The controller chair according to claim 1, wherein the left leg holding portion includes a left lower thigh housing recess and a left leg fixing airbag capable of being inflated and deflated and provided at least at one of either of both side wall inner surfaces of the left lower thigh housing recess, and the right leg holding portion includes a right lower thigh housing recess and a right leg fixing airbag capable of being inflated and deflated and provided at least at one of either of both side wall inner surfaces of the right lower thigh housing recess.

7. The controller chair according to claim 6, further comprising: a shoulder fixing portion provided at the backrest portion and arranged to fix the shoulders of the user to the backrest portion; and wherein the shoulder fixing portion includes a left shoulder holder projecting forward from a left side portion of the backrest portion further upward than a portion coupled to the left arm holding portion, a right shoulder holder projecting forward from a right side portion of the backrest portion further upward than a portion coupled to the right arm holding portion, a left shoulder pressing airbag capable of being inflated and deflated and provided at a surface of the left shoulder holder facing the right shoulder holder, and a right shoulder pressing airbag capable of being inflated and deflated and provided at a surface of the right shoulder holder facing the left shoulder holder.

8. The controller chair according to claim 1, further comprising: a shoulder fixing portion provided at the backrest portion and arranged to fix the shoulders of a user to the backrest portion; and wherein the shoulder fixing portion includes a left shoulder holder projecting forward from a left side portion of the backrest portion further upward than a portion coupled to the left arm holding portion, a right shoulder holder projecting forward from a right side portion of the backrest portion further upward than a portion coupled to the right arm holding portion, a left shoulder pressing airbag capable of being inflated and deflated and provided at a surface of the left shoulder holder facing the right shoulder holder, and a right shoulder pressing airbag capable of being inflated and deflated and provided at a surface of the right shoulder holder facing the left shoulder holder.

* * * * *